US009565286B2

(12) United States Patent
Chung et al.

(10) Patent No.: US 9,565,286 B2
(45) Date of Patent: Feb. 7, 2017

(54) INSOLE, MOBILE TERMINAL AND METHOD OF CONTROLLING THEREFOR

(71) Applicant: LG ELECTRONICS INC., Seoul (KR)

(72) Inventors: Minjoo Chung, Seoul (KR); Minjeong Shin, Seoul (KR); Chul Park, Seoul (KR); Jinho Cho, Seoul (KR); Kiwoong Kim, Seoul (KR); Sangki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/971,748

(22) Filed: Dec. 16, 2015

(65) Prior Publication Data

US 2016/0366266 A1 Dec. 15, 2016

(30) Foreign Application Priority Data

Jun. 11, 2015 (KR) .................... 10-2015-0082430

(51) Int. Cl.
| H04B 7/00 | (2006.01) |
| H04M 1/725 | (2006.01) |
| H04W 76/02 | (2009.01) |
| H04B 1/3827 | (2015.01) |

(52) U.S. Cl.
CPC ......... *H04M 1/72527* (2013.01); *H04B 1/385* (2013.01); *H04W 76/023* (2013.01)

(58) Field of Classification Search
CPC .............................. A43B 3/0005; G06F 3/011
USPC ......... 455/41.2, 41.3, 39, 100; 340/4.12, 4.1
See application file for complete search history.

(56) References Cited

U.S. PATENT DOCUMENTS

| 5,714,706 | A * | 2/1998 | Nakada | A43B 3/0005 36/139 |
| 6,646,643 | B2 * | 11/2003 | Templeman | G06F 3/012 345/473 |
| 8,021,269 | B2 * | 9/2011 | Jung | A43B 3/0005 482/4 |
| 2007/0003915 | A1 | 1/2007 | Templeman | |
| 2011/0199393 | A1 | 8/2011 | Nurse et al. | |
| 2014/0163708 | A1 * | 6/2014 | Yajima | G11B 20/10 700/94 |
| 2014/0266570 | A1 * | 9/2014 | Sharma | G09B 21/003 340/4.12 |
| 2014/0266571 | A1 * | 9/2014 | Sharma | G09B 21/003 340/4.12 |

OTHER PUBLICATIONS

Fukahori et al., "Exploring Subtle Foot Plantar-based Gestures with Sock-placed Pressure Sensors", CHI 2015, Human Factors in Computing Systems, ACM, Apr. 18, 2015, pp. 3019-3028.

* cited by examiner

*Primary Examiner* — Sonny Trinh
(74) *Attorney, Agent, or Firm* — Birch, Stewart, Kolasch & Birch, LLP

(57) ABSTRACT

A mobile terminal including a display unit; a wireless communication unit configured to wirelessly communicate with an insole in a shoe and an external device; and a controller configured to receive a foot gesture input signal from the insole for controlling the mobile terminal or the external device, control the function on the mobile according to the foot gesture input signal in response to the foot gesture input signal being mapped a function of the mobile terminal, and transmit a control signal to the external device to control the function on the external device in response the foot gesture input signal being mapped the function of the external device.

20 Claims, 17 Drawing Sheets

FIG. 2
(a)
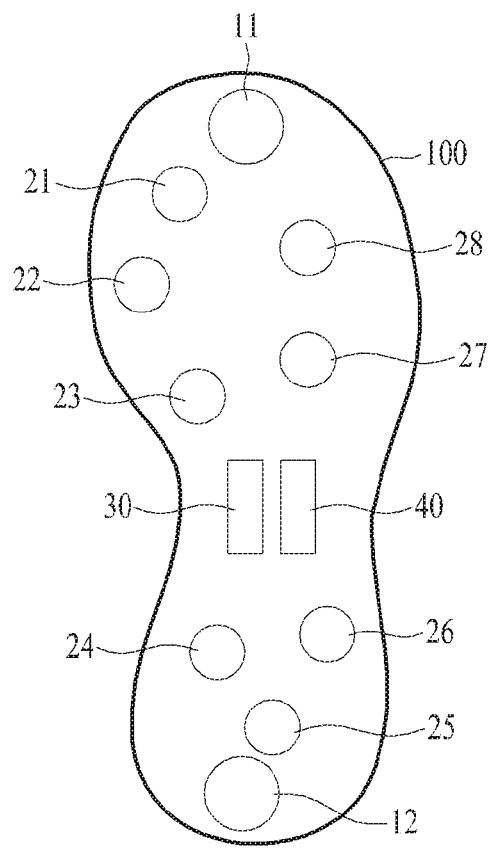
(b)

FIG. 9
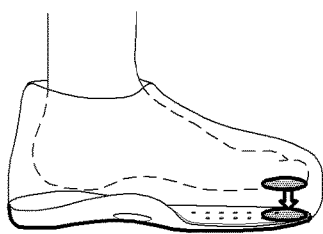
(a)
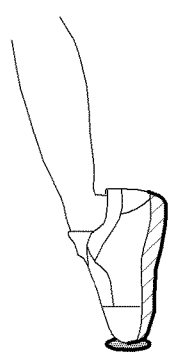
(b)
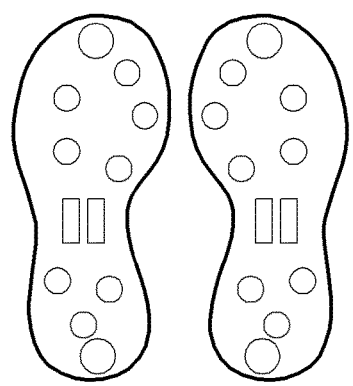
(c)

FIG. 10
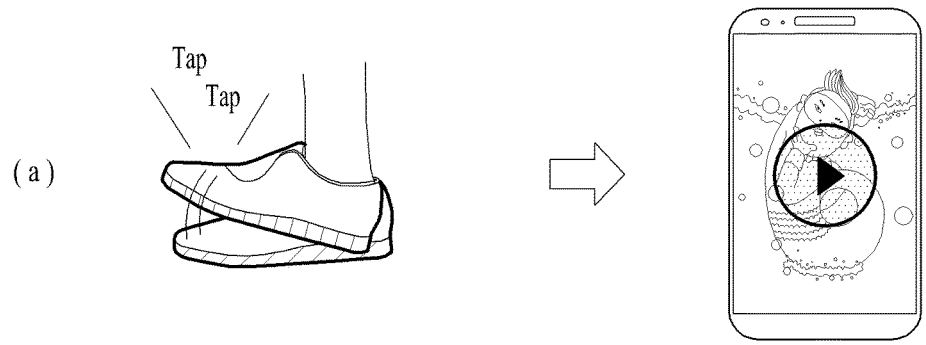
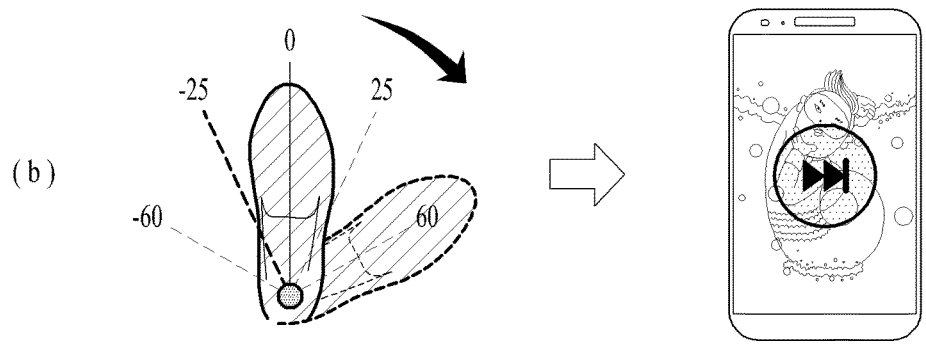
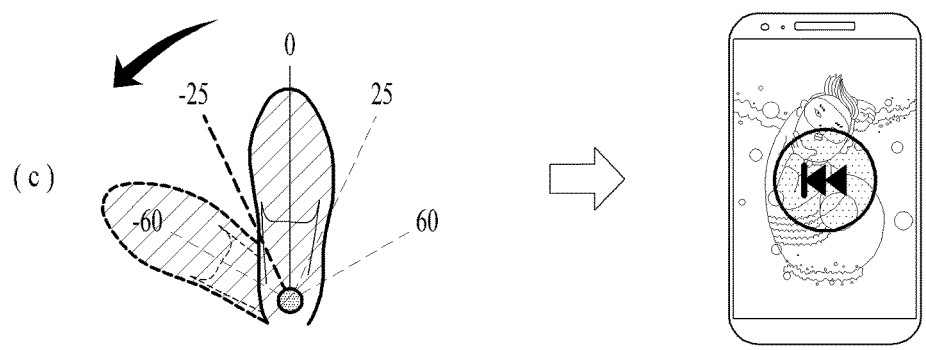

(a)  (b)

(a)  (b)

(a)  (b)

FIG. 16
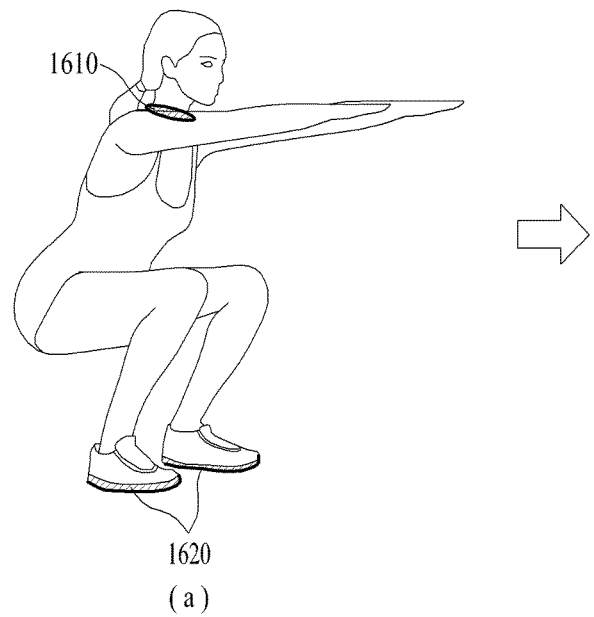 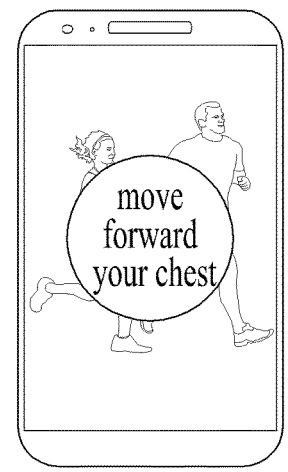
(a)            (b)
FIG. 17
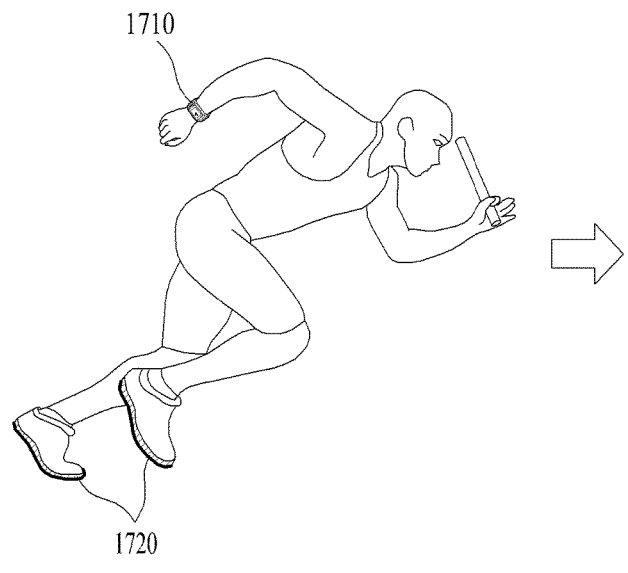 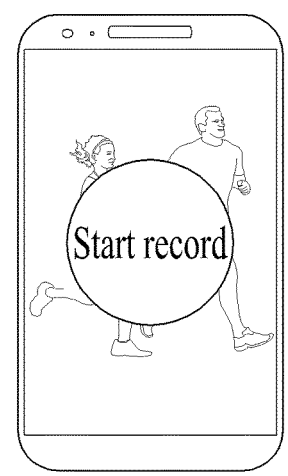
(a)            (b)

INSOLE, MOBILE TERMINAL AND METHOD OF CONTROLLING THEREFOR

This application claims the benefit of the Korean Patent Application No. 10-2015-0082430, filed on Jun. 11, 2015, which is hereby incorporated by reference as if fully set forth herein.

BACKGROUND OF THE INVENTION

Field of the Invention

The present invention relates to an insole, a mobile terminal and a method of controlling therefor, and more particularly, to a method of controlling a mobile terminal or an external device based on a signal sensed by an insole.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. In addition, the mobile terminals can be further classified into handheld terminals and vehicle mounted terminals. There are ongoing efforts to support and increase the functionality of mobile terminals. Such efforts include software and hardware improvements, as well as changes and improvements in the structural components which form the mobile terminal.

Meanwhile, a method of controlling a predetermined function using a gesture input corresponding to a movement of a hand or a whole body is limited, making it is difficult for the user to operate the mobile terminal when holding a heavy object in both hands, for example.

SUMMARY OF THE INVENTION

Accordingly, one object of the present invention is to solve the aforementioned problem and other problems.

Another object of the present invention is to provide an insole configured to control a mobile terminal or an external device, a mobile terminal and a method of controlling therefor based on an input signal sensed by the insole.

Another object of the present invention is to provide an insole configured to control a mobile terminal or an external device, a mobile terminal and a method of controlling therefor based on an input signal sensed by the insole and an input signal sensed by the external device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal can include a display unit, a communication unit configured to receive a first input signal from an insole and a controller configured to control a predetermined function to be performed according to the received first input signal. In this instance, the predetermined function includes an operation mapped to the mobile terminal in response to the first input signal sensed by the insole.

To further achieve these objects and other advantages and in accordance with the purpose of the invention, as embodied and broadly described herein, according to a different embodiment, an insole can include a sensing unit configured to sense a first input signal and a second input signal, a communication unit configured to transmit the second input signal to a mobile terminal and receive a control signal for performing a predetermined function from the mobile terminal and a controller configured to activate the insole according to the first input signal and control the predetermined function to be performed according to the control signal. In this instance, the predetermined function includes an operation mapped to the insole in response to the second input signal sensed by the insole.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 2 is a diagram illustrating an example of an insole according to an embodiment of the present invention;

FIG. 9 is a diagram illustrating an embodiment of a method of activating an insole according to an embodiment of the present invention;

FIG. 10 is a diagram of an embodiment for a mobile terminal to perform a predetermined function based on a gesture input sensed by an insole;

FIG. 16 is a diagram illustrating an example of controlling a predetermined function based on a gesture input sensed by an insole according to an embodiment of the present invention;

FIG. 17 is a diagram illustrating an example of controlling a predetermined function based on a gesture input sensed by an insole according to an embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
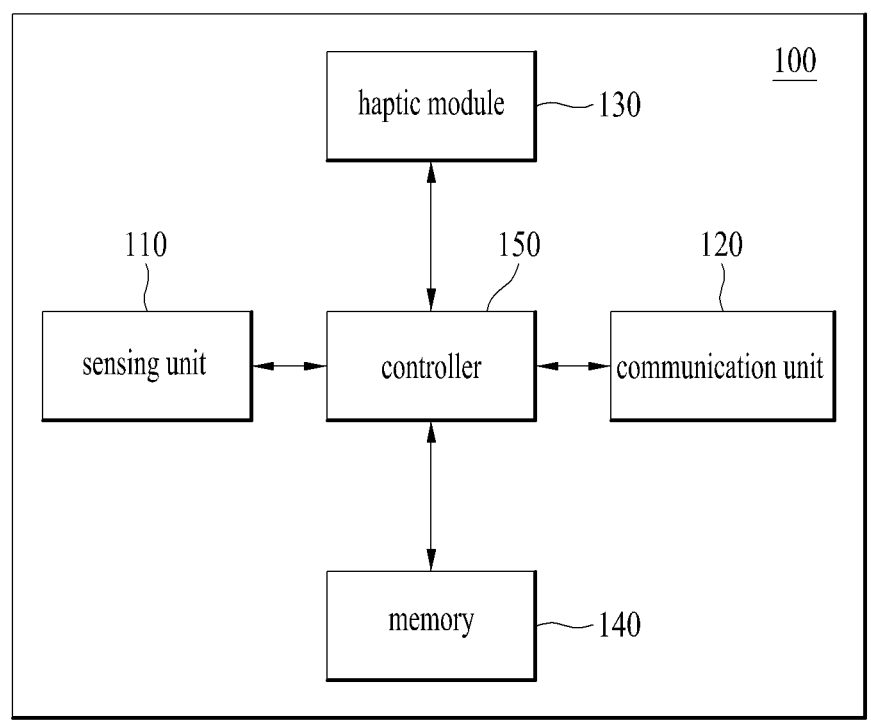
FIG. 1 is a block diagram illustrating an insole according to an embodiment of the present invention.

FIG. 1 is a block diagram illustrating an insole according to an embodiment of the present invention and FIG. 2 is a conceptual diagram illustrating a smart insole according to an embodiment of the present invention seen from a different view.

A smart insole 100 can include a sensing unit 110, a communication unit 120, a haptic module 130, a memory 140 and a controller 150. Since configuration elements shown in FIG. 1 are not mandatory to implement the smart insole, the smart insole explained in the present specification may have configuration elements more or less than the aforementioned configuration elements.

The sensing unit 110 senses various inputs of a user and environment of an insole and can deliver a sensed result to the controller 150 to enable the controller to perform an operation according to the sensed result. In addition, the sensing unit 110 can include one or more sensors to sense at least one of information on environment surrounding an insole and user information. For example, unlike a sensing unit of a mobile terminal, the sensing unit 110 can include various sensors capable of sensing information via a foot. For example, in the present invention, the sensing unit 110 can include a pressure sensor, a motion sensor, a barometer sensor, a PPG (photoplethysmogram) sensor and the like. In this instance, two or more pressure sensors and two or more motion sensors can be installed in the sensing unit. Regarding this, it will be described later with reference to FIG. 2.

First of all, the motion sensor can sense a movement of an insole. For example, the motion sensor can include such a sensor capable of detecting a movement as a gyro sensor, an acceleration sensor and the like. The gyro sensor detects an angular speed and can sense a slope of an insole. In addition, the acceleration sensor can sense a moving direction and acceleration of an insole. The pressure sensor corresponds to a device configured to sense pressure applied to an insole and the barometer sensor corresponds to a sensor configured to measure a change of atmospheric pressure and can sense a height of a current position. The PPG sensor measures penetration amounts of light using an optical sensor and can measure heartbeat.

In one embodiment, the sensing unit 110 senses a gesture input of an insole and can transmit the sensed gesture input to the controller 150. In another embodiment, the sensing unit 110 senses such a signal as pressure, a slope and the like from an insole and can transmit the signal to the controller 150.

The communication unit 120 performs communication with an external device using various protocols and can transceive data with the external device. In addition, the communication unit 120 accesses a network in wired or wireless and can transceive digital data such as contents and the like with the network. For example, the communication unit 120 can include a wireless internet module, a short-range communication module, a location information module and the like.

The wireless internet module indicates a module for wireless internet access and can be installed in the inside of a mobile terminal or the outside of the mobile terminal. The wireless internet module is configured to transmit and receive a radio signal in a communication network according to wireless internet technologies.

Examples of the wireless internet technology may include WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced) and the like. The wireless internet module transmits and receives data according to at least one or more wireless internet technologies in a scope including an internet technology which is not listed on the aforementioned technologies.

From a standpoint that wireless internet access using WiBro, HSDPA, HSUPA, GSM, CDMA, WCDMA, LTE, LTE-A and the like is performed via a mobile communication network, the wireless internet module performing wireless internet access via the mobile communication network can be comprehended as a sort of the mobile communication module.

The short-range communication module is used for performing short range communication and can support the short range communication using at least one technology of Bluetooth™, RFID (Radio Frequency Identification), Infrared Data Association (IrDA), UWB (Ultra Wideband), Zig-Bee, NFC (Near Field Communication), Wi-Fi (Wireless-Fidelity), Wi-Fi Direct, and Wireless USB (Wireless Universal Serial Bus). The short-range communication module can support wireless communication between an insole and a wireless communication system, between an insole and a different insole or between an insole and a network at which a different insole is located via short-range wireless communication network (wireless area networks). The short-range wireless communication network may correspond to a short-range wireless personal communication network (wireless personal area networks).

The location information module is a module for obtaining a location (or current location) of an insole. A representative example of the location information module may include a GPS (global positioning system) module or a Wi-Fi (wireless fidelity) module. For example, if an insole utilizes the GPS module, the insole can obtain a location of the insole using a signal sent from a GPS satellite. As a different example, if an insole utilizes the Wi-Fi module, the insole can obtain a location of the insole based on information of a wireless AP (access point) configured to transceive a radio signal with the Wi-Fi module. If necessary, the location module can alternatively or additionally perform a prescribed function of a different module belonging to the communication unit to obtain data on a location of an insole. The location information module is a module for obtaining a location (or current location) of an insole. The location information module is non-limited by a module directly calculating or obtaining a location of an insole.

In one embodiment, the communication unit 120 can transmit an input signal sensed in an insole to a mobile terminal or an external device. In another embodiment, the communication unit 120 can receive a control signal from a mobile terminal. The haptic module 130 generates various tactile effects capable of being felt by a user. A representative example of the tactile effects generated by the haptic module 130 corresponds to vibration. Strength and a pattern of the vibration generated by the haptic module 130 can be controlled by a selection of a user or configuration of the controller 150. For example, the haptic module 130 can output vibrations different from each other by combining the vibrations with each other or the haptic module can sequentially output the vibrations.

The haptic module 130 may generate various tactile effects including an effect resulted from arranging pins vertically moving for a contacted skin, an effect resulted from jet force or suction force of air via a nozzle or an intake, an effect resulted from flickering on a skin, an effect resulted from a contact of an electrode, an effect resulted from stimulation of electrostatic and the like, and an effect resulted from reproducing sense of warm and cold using an element capable of making heat or absorbing heat.

The haptic module 130 can deliver a tactile effect to a user via a direct contact and can be implemented to make a user feel a tactile effect via a muscle sense of a finger or an arm of the user. Two or more haptic modules 130 can be installed in a mobile terminal according to a configuration of the mobile terminal. In one embodiment, the haptic module 130 can provide a user with a haptic feedback. The memory 140 stores data supporting various functions of the insole 100. The memory 140 can store a plurality of application programs (or applications) drivable in the insole 100, data for an operation of the insole 100 and commands.

Meanwhile, the insole 100 can include a power supply unit. The power supply unit supplies power to each of configuration elements included in the insole 100 by being granted external power and internal power under the control of the controller 150. The power supply unit includes a battery and the battery may correspond to an embedded battery or a disposable battery. In one embodiment, the power supply unit can include a connection port. In addition, in another embodiment, the power supply unit can be configured to charge a battery in wireless. In this instance, an external wireless power transmission device can deliver power to the power supply unit using at least one of an inductive coupling scheme based on a magnetic induction phenomenon and a magnetic resonance coupling scheme based on an electromagnetic resonance phenomenon.

At least a part of the aforementioned configuration elements can operate by cooperating with each other to implement an operation of the insole 100, a control of the insole 100 and a method of controlling therefor according to various embodiments described in the following. In addition, the operation of the insole 100, the control of the insole and the method of controlling therefor can be implemented on the insole by executing at least one or more application programs stored in the memory 140. In one embodiment of the present invention, operations performed by the insole can be controlled by the controller 150. For clarity, assume that the operations are commonly performed or controlled by the insole in the following drawings and descriptions.

Next, FIG. 2 is a diagram illustrating an example of an insole according to an embodiment of the present invention. More specifically, FIG. 2 (*b*) shows a front view of the insole and various units mounted on the insole and FIG. 2 (*a*) shows a side view of the insole.

The insole 100 is installed in the inside of a shoe of a user and functions of providing comfort to a foot of the user. The insole 100 can include a left insole and a right insole. The embodiment of FIG. 2 (*a*) shows a left insole. Further, in general, the insole 100 can be manufactured in various sizes based on a size of a foot of a user and the insole 100 and a sole of the user are in contact. Based on this, the present invention provides a method of providing various functions to at least one of an insole, a mobile terminal and an external device by adding an input signal to the insole 100 using a foot.

As mentioned earlier in FIG. 1, the sensing unit of the insole 100 can include various sensors. Referring to an embodiment of FIG. 2 (b), the insole 100 can include motion sensors 11/12, pressure sensors 21 to 28, a barometer sensor 30, and a PPG (photoplethysmogram) sensor 30. Further, the insole 100 can include a GPS (global positioning sensor) and the like. As shown in FIG. 2 (b), each of the motion sensors 11/12 can be distributed to a tiptoe and a heel, respectively.

Further, the pressure sensors 21 to 28 can be distributed to the whole of the insole 100. The barometer sensor 30 and the PPG sensor 30 can be arranged at the center of the insole 100. In addition, the insole 100 can include a controller, a communication unit and a memory by itself. For example, as shown in FIG. 2 (b), the controller, the communication unit and the controller are represented by the numeral 40 and can be arranged at the center of the insole 100.

Figure 3:
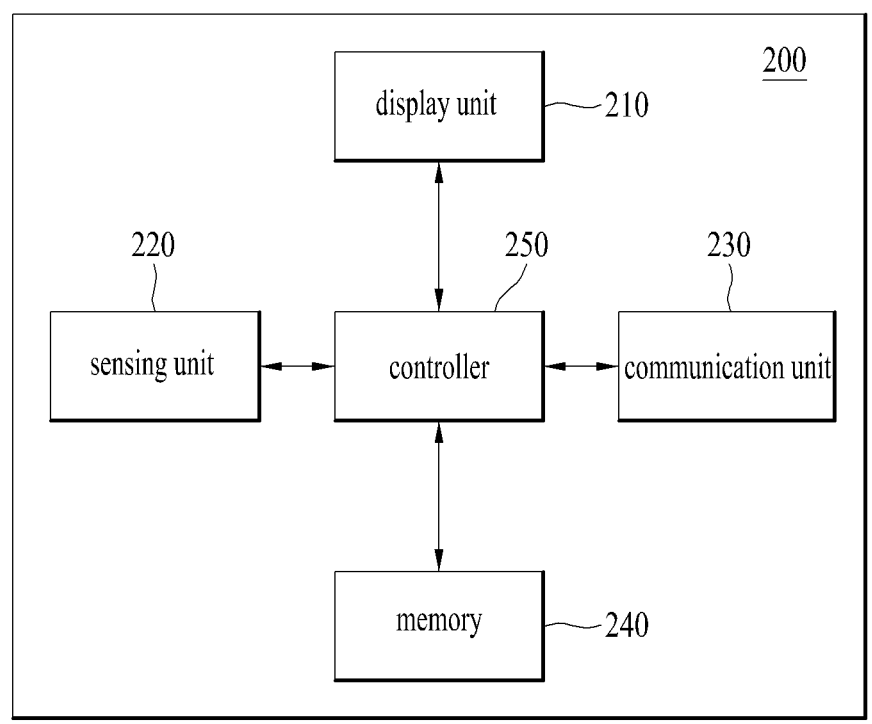
FIG. 3 is a block diagram illustrating a mobile terminal according to an embodiment of the present invention.

Next, FIG. 3 is a block diagram illustrating a mobile terminal according to an embodiment of the present invention. A mobile terminal 200 can include a display unit 210, a sensing unit 220, a communication unit 230, a memory 230 and a controller 250. Since configuration elements shown in FIG. 3 are not mandatory to implement the mobile terminal 200, the mobile terminal described in the present specification can include configuration element more or less than the aforementioned configuration elements.

The display unit 210 displays (outputs) information processed by the mobile terminal 200. For example, the display unit 210 can display information on an execution screen of an application program executed in the mobile terminal 200, UI (user interface) according to the information on the execution screen, or GUI (graphic user interface) information. In one embodiment, the display unit 210 can display a predetermined function, which is controlled based on an input signal sensed by an insole.

The sensing unit 220 can include one or more sensors configured to sense at least one of information of a mobile terminal, information on environment surrounding the mobile terminal and user information. For example, the sensing unit 220 can include at least one of a proximity sensor, an illumination sensor, a touch sensor, an acceleration sensor, a magnetic sensor, a G-sensor, a gyroscope sensor, a motion sensor, an RGB sensor, an IR (infrared) sensor, a finger scan sensor, a ultrasonic sensor, an optical sensor (e.g., a camera), a microphone, a battery gauge, an environment sensor (e.g., a barometer, a hygrometer, a thermometer, a radioactive detection sensor, a heat detection sensor, a gas detection sensor, etc.), a chemical sensor (e.g., an e-nose, a healthcare sensor, a biometrics sensor, etc.). Meanwhile, the mobile terminal disclosed in the present specification can utilize information sensed by at least two or more sensors among the aforementioned sensors by combining the information with each other.

The communication unit 230 can include at least one of a mobile communication module, a wireless internet module, a short-range communication module, and a location information module. The mobile communication module transceives a radio signal with at least one of a base station, an external terminal and a server in a mobile communication network, which is constructed according to technical standards for mobile communication or a communication scheme (e.g., GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced) etc.). The radio signal can include data of various forms according to transmission and reception of an audio call signal, a video call signal, or a text/multimedia message.

The wireless internet module indicates a module for wireless internet access and can be installed in the inside of a mobile terminal 100 or the outside of the mobile terminal 100. The wireless internet module is configured to transmit and receive a radio signal in a communication network according to wireless internet technologies.

Examples of the wireless internet technology may include WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced). The wireless internet module transmits and receives data according to at least one or more wireless internet technologies in a scope including an internet technology which is not listed on the aforementioned technologies. From a standpoint that wireless internet access using WiBro, HSDPA, HSUPA, GSM, CDMA, WCDMA, LTE, LTE-A and the like is performed via a mobile communication network, the wireless internet module performing wireless internet access via the mobile communication network can be comprehended as a sort of the mobile communication module.

The short-range communication module is used for performing short range communication and can support the short range communication using at least one technology of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, and Wireless USB (Wireless Universal Serial Bus). The short-range communication module can support wireless communication between the mobile terminal 200 and a wireless communication system, between the mobile terminal 200 and a different mobile terminal or between the mobile terminal 200 and a network at which a different mobile terminal (or external server) is located via a short-range wireless communication network (wireless area networks). The short-range wireless communication network may correspond to a short-range wireless personal communication network (wireless personal area networks).

In this instance, the different mobile terminal may correspond to a wearable device (e.g., a smartwatch, a smart glass, a HMD (head mounted display)) capable of exchanging data with (or capable of interworking with) the mobile terminal 200 according to an embodiment of the present invention. The short-range communication module can detect (recognize) a wearable device capable of performing communication with the mobile terminal 200 located near the mobile terminal 200. Moreover, if the detected wearable device corresponds to a device authenticated to perform communication with the mobile terminal 200 according to an embodiment of the present invention, the controller 250 can transmit at least a part of data processed by the mobile terminal 200 to the wearable device via the short-range communication module. Hence, a user of the wearable device can use the data processed by the mobile terminal 200 via the wearable device. For example, if phone call is received by the mobile terminal 200, the user can perform the phone call via the wearable device. If a message is received by the mobile terminal 200, the user can check the received message via the wearable device.

The location information module corresponds to a module for obtaining a location (or a current location) of the mobile terminal. A representative example of the location information module may correspond to a GSP (global positioning system) module or a Wi-Fi (wireless fidelity) module. For example, the mobile terminal can obtain a location of the mobile terminal using a signal sent from a GPS satellite by utilizing the GPS module. As a different example, the mobile terminal can obtain a location of the mobile terminal based on information on a wireless AP (access point) configured to transceive a radio signal with the Wi-Fi module by utilizing the Wi-Fi module. If necessary, the location module can alternatively or additionally perform a prescribed function of a different module belonging to the communication unit 230 to obtain data on a location of the mobile terminal. The location information module is a module for obtaining a location (or current location) of the mobile terminal. The location information module is non-limited by a module directly calculating or obtaining a location of the mobile terminal.

In one embodiment, the communication unit 230 can receive an input signal from an insole or an external device. In addition, the communication unit 230 can transmit a control signal to the insole or the external device. Further, the memory 240 stores data supporting various functions of the mobile terminal 200. The memory 240 can store a plurality of application programs (or applications) drivable in the mobile terminal 200, data for an operation of the mobile terminal 200 and commands. At least a part of the application programs can be downloaded from an external server via wireless communication. In addition, at least a part of the application programs may exist in the mobile terminal 200 when the mobile terminal is manufactured for a basic function (e.g., receiving a call, making a call, receiving a message, sending a message) of the mobile terminal 200. Meanwhile, an application program is stored in the memory 240, is installed in the mobile terminal 200 and the controller 250 can perform an operation (or a function) of the mobile terminal.

The memory 240 can include a storing medium of at least one type of a flash memory type, a hard disk type, an SSD (solid state disk) type, an SSD (silicon disk drive) type, a multimedia card micro type, a card type memory (e.g., an SD or an XD memory), a RAM (random access memory), an SRAM (static random access memory), a ROM (read-only memory), an EEPROM (electrically erasable programmable read-only memory), a PROM (programmable read-only memory), a magnetic memory, a magnetic disk and an optical disk. The mobile terminal 200 may operate in relation to a web storage performing a storing function of the memory on the internet.

Besides the operation related to the application program, the controller 250 generally controls overall operation of the mobile terminal 200. The controller 250 can provide or process information appropriated for a user by processing a signal, data, information and the like input or output via the aforementioned configuration elements or executing an application program stored in the memory 240.

Further, the controller 250 can control at least a part of the configuration elements mentioned earlier in FIG. 1 to execute the application program stored in the memory 240.

Moreover, the controller 250 can operate at least two or more configuration elements among the configuration elements included in the mobile terminal 200 by combining the configuration elements with each other to execute the application program. In one embodiment, the controller 250 can generate a control signal based on a received input signal to enable an insole or an external device to perform a predetermined function. In addition, the controller 250 can control a mobile terminal to perform a predetermined function based on a received input signal.

At least a part of the aforementioned configuration elements can operate by cooperating with each other to implement an operation of a mobile terminal, a control of the mobile terminal and a method of controlling therefor according to various embodiments described in the following. Further, the operation of the mobile terminal, the control of the mobile terminal and the method of controlling therefor can be implemented on the mobile terminal by executing at least one or more application programs stored in the memory 240.

In one embodiment of the present invention, operations performed by the mobile terminal can be controlled by the controller 150. For clarity, assume that the operations are commonly performed or controlled by the mobile terminal in the following drawings and descriptions.

Figure 4:
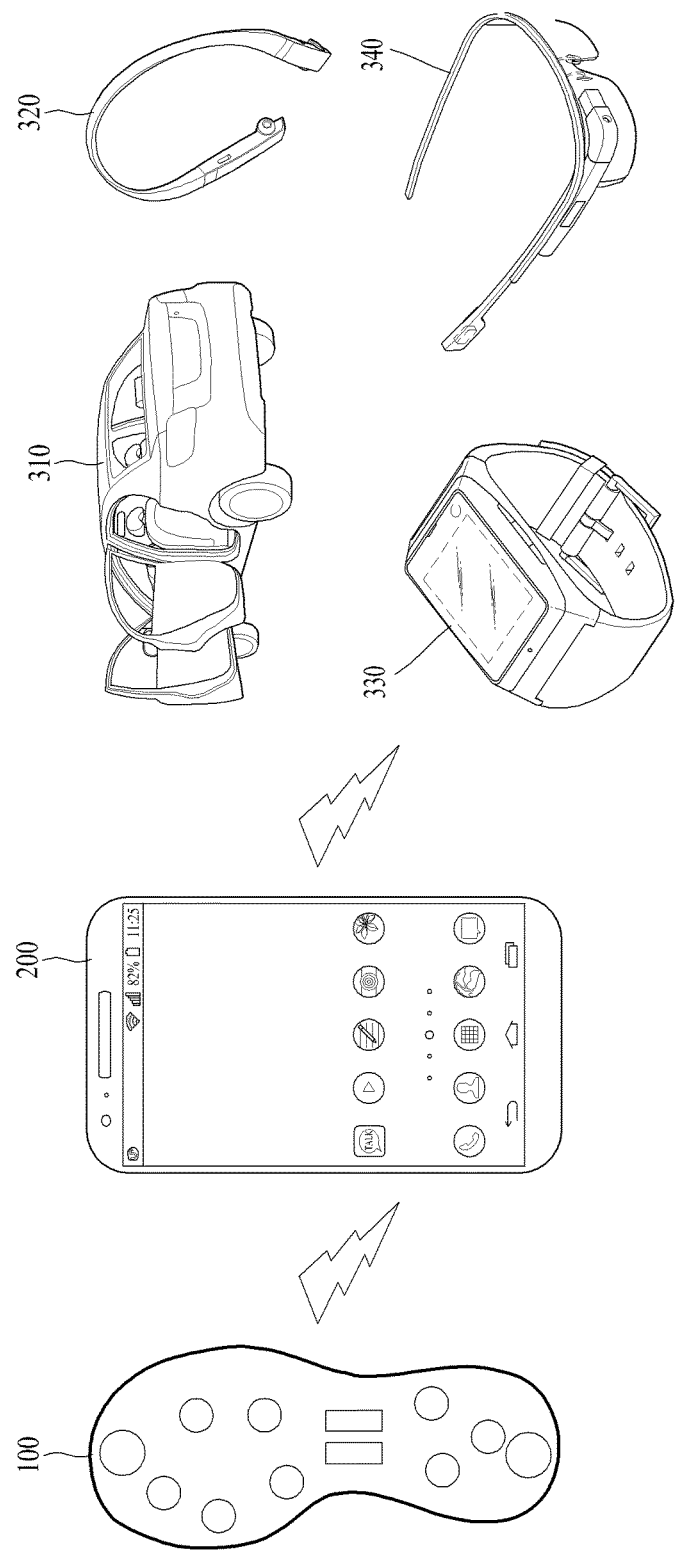
FIG. 4 is a diagram illustrating an external device capable of being connected with a mobile terminal according to an embodiment of the present invention.

FIG. 4 is a diagram illustrating an external device capable of being connected with a mobile terminal according to an embodiment of the present invention. The present invention provides a method of controlling at least one of an insole 100, a mobile terminal 200 and an external device 310/320/330/340 according to an input signal sensed by the insole 100. In more detail, FIG. 4 is a diagram illustrating an example of a device becoming a control target. For example, in an embodiment of FIG. 4, the external device can include a car 310, a neckband 320, a smartwatch 330 and a smart glass 340. In addition, like a configuration module of a mobile terminal shown in FIG. 3, the external device can include a display unit, a sensing unit, a communication unit, a memory and a controller. Meanwhile, the external device is non-limited by the device shown in FIG. 4.

For example, in a relation between the insole 100 and the mobile terminal 200, the mobile terminal 200 is a main device and the insole 100 is a sub device. In this instance, a signal sensed by the insole 100 is transmitted to the mobile terminal 200 and the mobile terminal 200 can control an operation of at least one of the insole 100 and the mobile terminal 200 based on the signal.

Thus, the insole 100 and the mobile terminal 200 can perform pairing. In this instance, the pairing indicates a connection for transceiving data between the insole 100 and the mobile terminal 200. When performing the pairing, the insole 100 and the mobile terminal 200 perform communication access and can transceiver data between the insole and the mobile terminal in both directions. The pairing can be performed via BLUETOOTH, NFC (near field communication) or the like.

Meanwhile, the mobile terminal 200 can control an operation of the external device 310/320/330/340 based on the signal received from the insole 100. Thus, the mobile terminal 200 can perform pairing with the external device 310/320/330/340. In the following, the embodiments of FIG. 10 to FIG. 17 are explained assuming pairing is performed between the insole 100, the mobile terminal 200 and the external device 310/320/330/340.

Figure 5:
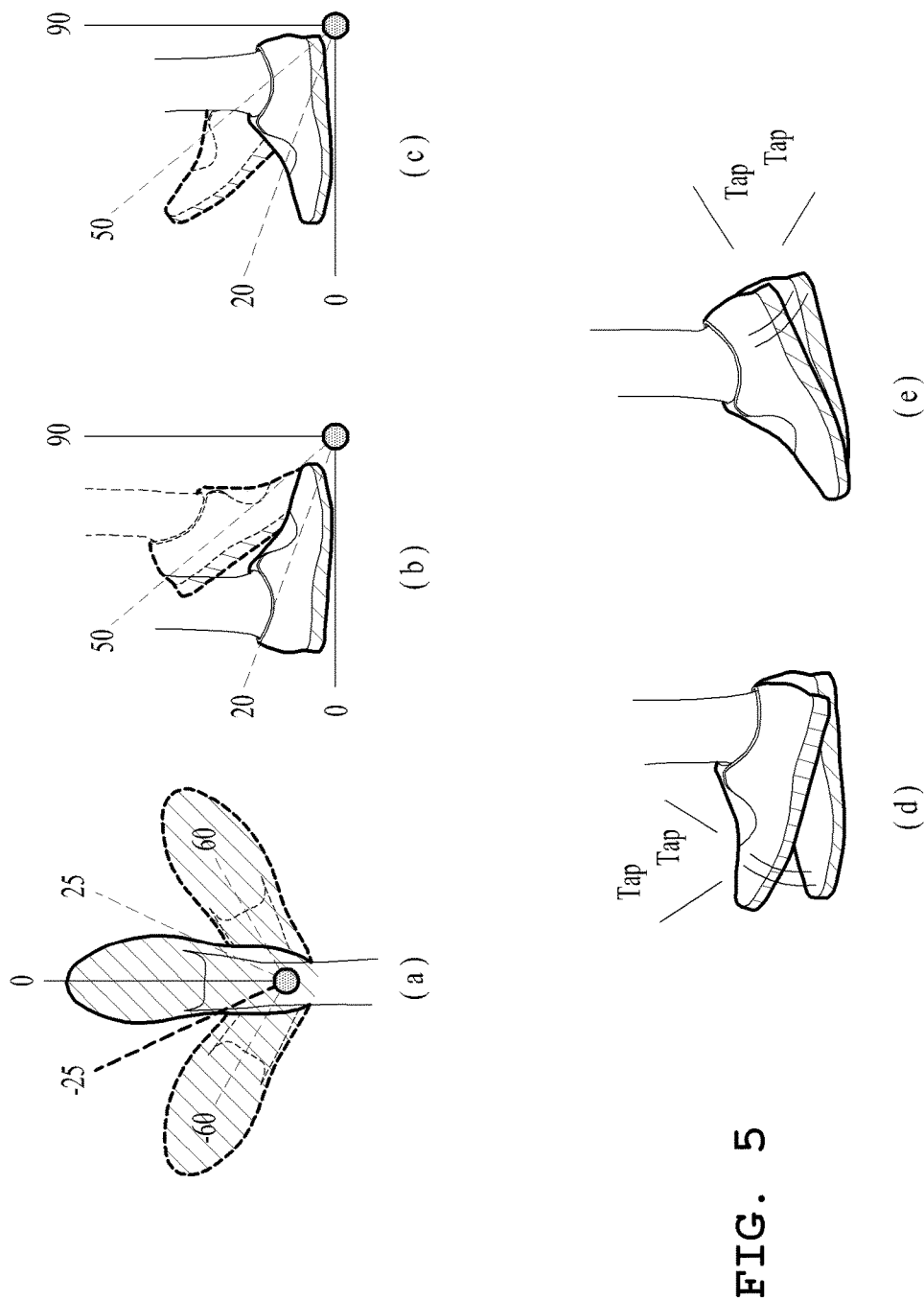
FIG. 5 is a diagram illustrating an example of various gestures using a foot according to an embodiment of the present invention.
Figure 6:
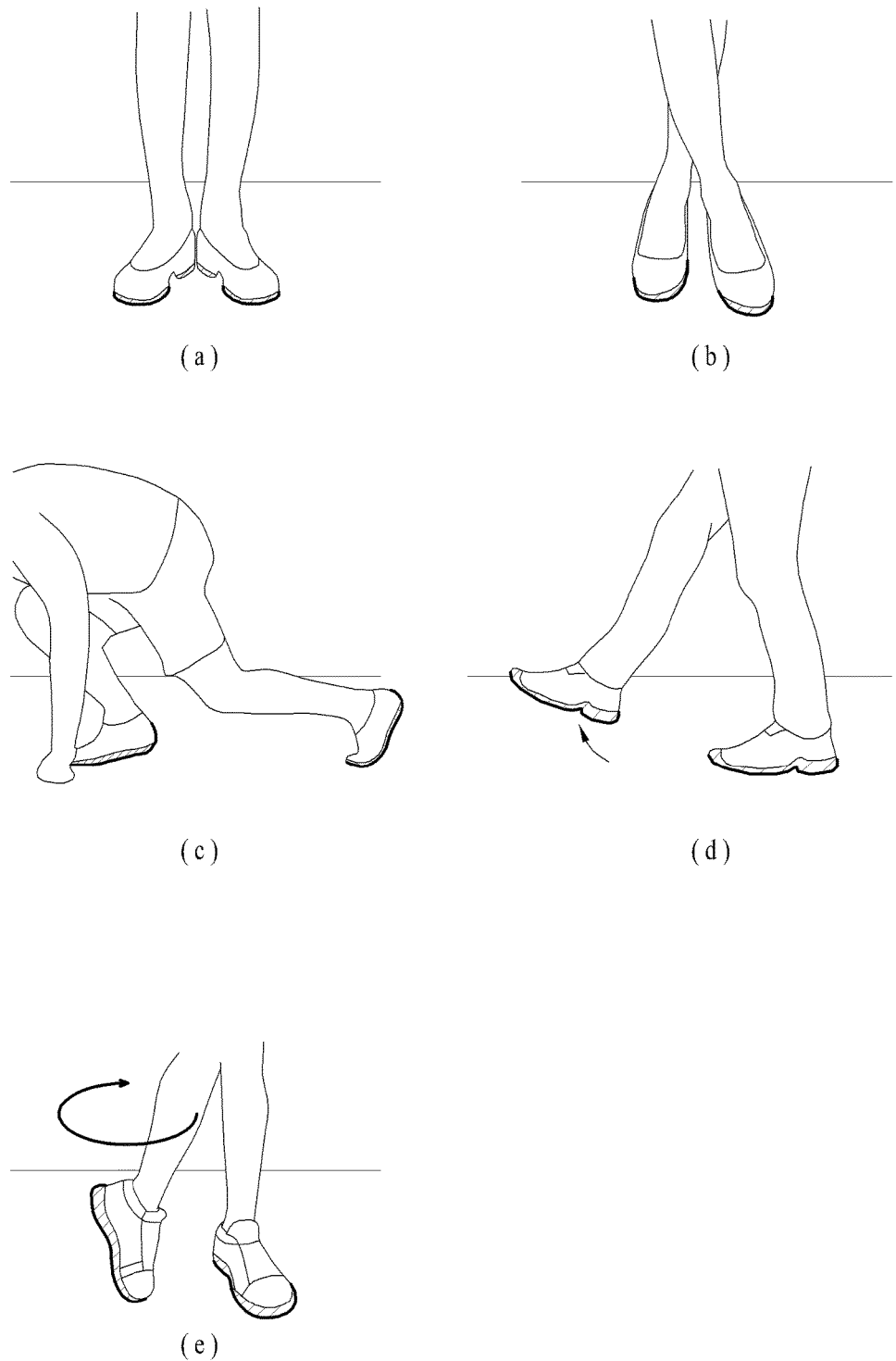
FIG. 6 is a diagram illustrating an example of various gestures using a foot according to an embodiment of the present invention.

Next, FIGS. 5 and 6 are diagrams illustrating an example of various gestures using a foot according to an embodiment of the present invention. In particular, FIG. 5 and FIG. 6 are explained assuming a user is wearing insoles on both feet. First of all, FIG. 5 is a diagram illustrating a gesture input capable of being performed by a foot among both feet when a user is wearing insoles. A gesture input performed by a foot can include both sensing a fixed foot and sensing a moving foot.

In one embodiment, FIG. 5 (*a*) shows a gesture that a tiptoe of a foot is positioned at the left and the right based on a center when a heel of the foot is fixed. For example, the tiptoe of the foot can be positioned at the ±25 degrees left and right or ±60 degrees left and the right based on the center. In another embodiment, FIG. 5 (*b*) shows a gesture that a heel of a foot is moving up and down when a tiptoe of the foot is fixed. For example, the heel of the foot can be positioned at 20 degrees or 50 degrees up from the ground. Further, in another embodiment, FIG. 5(*c*) shows a gesture that a tiptoe of a foot is moving up and down when a heel of the foot is fixed. For example, the tiptoe of the foot can be positioned at 20 degrees or 50 degrees up from the ground.

In addition, in another embodiment, FIG. 5 (*d*) shows a gesture that a tiptoe of a foot is moving up and down when a heel of the foot is fixed. For example, a gesture of moving the tiptoe of the foot up and down two times when the heel of the foot is fixed can be included. Further, in another embodiment, FIG. 5 (*e*) shows a gesture that a heel of a foot is moving up and down when a tiptoe of the foot is fixed. For example, the embodiment can include a gesture of moving the heel of the foot up and down two times when the tiptoe of the foot is fixed. Meanwhile, a gesture input by a foot is non-limited by the aforementioned embodiments.

In addition, a gesture of using a foot may include a gesture of pushing an insole by a big toe. Further, a gesture of using a foot may include a gesture of dragging the foot in one direction among left, right, up and down direction while the foot and the ground are in contact. Subsequently, FIG. 6 is a diagram illustrating a gesture input using both feet when a user is wearing insoles. A gesture input by both feet can includes sensing two fixed feet and sensing at least one moving foot among the two feet.

In one embodiment, FIG. 6 (*a*) shows a gesture that heels of both feet are contacted with each other and tiptoes of both feet are not contacted with each other as a fixed gesture. In another embodiment, FIG. 6 (*b*) shows a gesture that both feet are overlapped with each other in up and down direction as a fixed gesture. Further, in another embodiment, FIG. 6 (*c*) shows a gesture that tiptoes of both feet and the ground are in contact and heels of both feet and the ground are not in contact as a fixed gesture.

In another embodiment, FIG. 6 (*d*) shows a gesture that one foot is being lifted up to the front side of a user from the ground while another foot and the ground are in contact as a moving gesture. Also, in another embodiment, FIG. 6 (*e*) shows a gesture that one foot and the ground are in contact and another foot is rotating while a tiptoe of the foot and the ground are in contact. A gesture of using both feet is non-limited by the aforementioned embodiments and can include various gestures using both feet.

Figure 7:
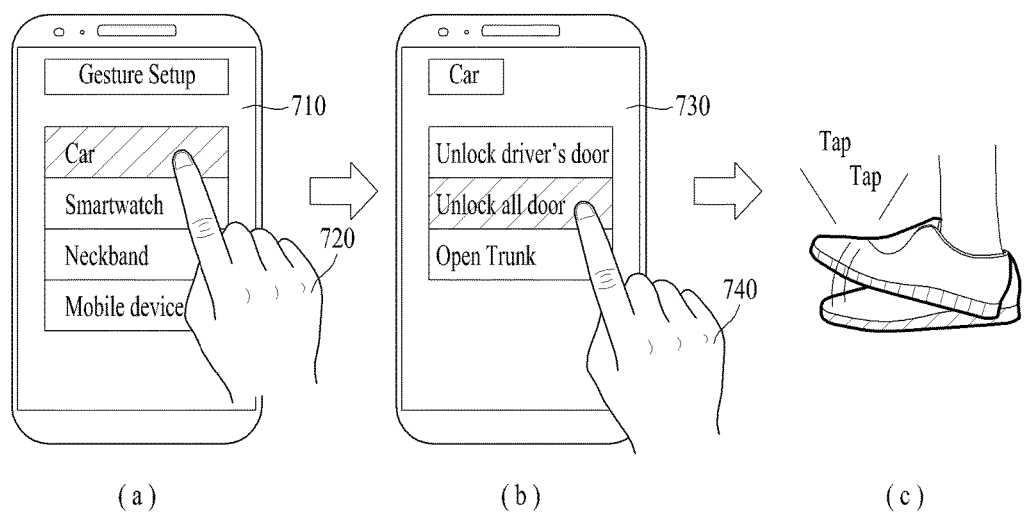
FIG. 7 is a diagram illustrating a method of mapping an input signal sensed by an insole to a predetermined function according to an embodiment of the present invention.
Figure 8:
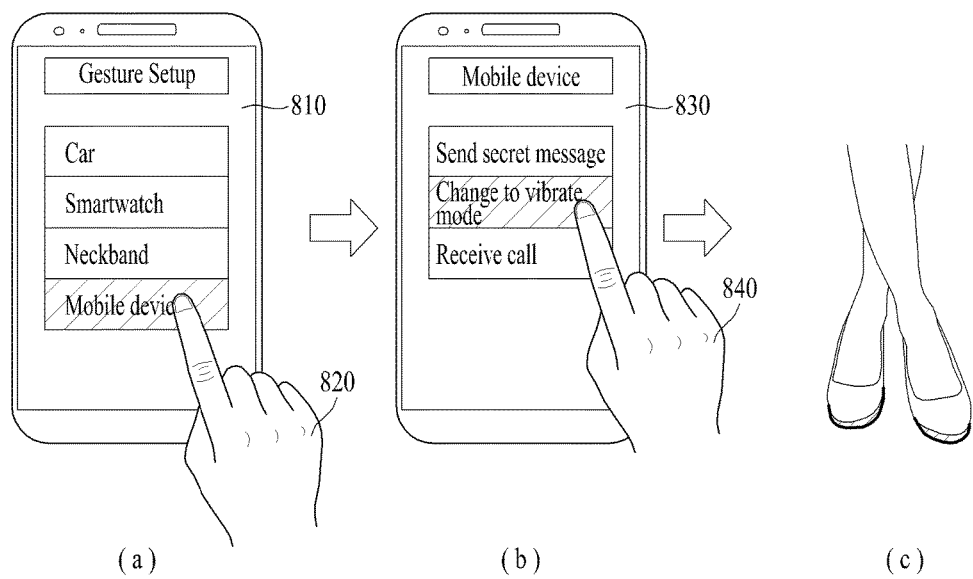
FIG. 8 is a diagram illustrating a method of mapping an input signal sensed by an insole to a predetermined function according to an embodiment of the present invention.

Next, FIGS. 7 and 8 are diagrams illustrating a method of mapping an input signal sensed by an insole to a predetermined function according to an embodiment of the present invention. A predetermined function corresponds to an operation configured to be performed in a device by a mobile terminal in response to an input signal sensed by an insole. For example, the device can include a mobile terminal, an insole and an external device. In this instance, the operation configured to be performed in the device by the mobile terminal can include not only an operation performed by the mobile terminal itself but also an operation performed by the insole or the external device connected with the mobile terminal. For example, as mentioned earlier in FIG. 4, the external device can include various devices such as a car, a neckband, a smartwatch, a smart glass and the like.

In order to map the input signal sensed by the insole to the predetermined function, the mobile terminal and the insole can perform pairing. In addition, if the device performing the predetermined function is not the mobile terminal, the mobile terminal can perform pairing with an external device to perform the predetermined function.

First of all, FIG. 7 shows an embodiment of mapping a predetermined function to an external device when a device for performing the predetermined function is not a mobile terminal. Also, the mobile terminal can execute an application for configuring the predetermined function. In this instance, as shown in FIG. 7 (*a*), the mobile terminal can display a menu option 710 for selecting a device performing the predetermined function. The menu option 710 can include such a menu as a car, a smartwatch, a neckband, a mobile terminal and the like. Besides, the menu option can include various devices capable of being paired with the mobile terminal.

In this instance, the mobile terminal can sense a first input signal 720 input on a menu of the menu option 710. In this instance, the first input signal 720 can include a touch input, a voice input, a gesture input and the like. In an embodiment of FIG. 7 (*a*), the mobile terminal can sense the first input signal input on 'car.' In this instance, the mobile terminal can display various sub menu options 730 capable of being configured in relation to the 'car.' In an embodiment of FIG. 7 (*b*), the sub menu option 730 can include menus such as unlock driver's door, unlock all doors, open trunk and the like. However, the sub menu option 730 is non-limited by the aforementioned menus. The sub menu option can include various operations capable of being performed in a car.

Subsequently, the mobile terminal can sense a second input signal 740 input on one of the sub menu options 730. In this instance, the second input signal 740 can include a touch input, a voice input, a gesture input. In an embodiment of FIG. 7 (*b*), the mobile terminal can sense the second input signal for an operation of unlocking all doors of a car. In this instance, the mobile terminal determines to perform mapping to the operation of unlock all doors of a car and can induce a user to perform a gesture to be mapped to the operation. Also, the mobile terminal displays such a message as 'perform gesture' on the display unit and can induce a user to perform a gesture operation when the user is wearing an insole.

In this instance, as shown in FIG. 7 (*c*), at least one of a left insole and a right insole can sense a gesture of tapping the ground two times tapped by a tiptoe of a foot. Further, the insole can transmit a signal of the sensed gesture tapping the ground two times to the mobile terminal. The mobile terminal can map the gesture of tapping the ground two times tapped by at least one of the left insole and the right insole to the operation of unlocking all doors of a car.

FIG. 8 shows an embodiment of mapping a predetermined function to a mobile terminal when a device performing the predetermined function corresponds to the mobile terminal. In the embodiment of FIG. 8, content overlapped with what is mentioned earlier in FIG. 7 is omitted. In addition, the mobile terminal can execute an application for configuring a predetermined function. In this instance, as shown in FIG. 8 (*a*), the mobile terminal can display a menu option 810 for selecting a device performing the predetermined function. In an embodiment of FIG. 8 (*a*), the mobile terminal can sense a first input signal 820 selecting the mobile terminal from the menu option 810.

In this instance, the mobile terminal can display a sub menu option 830 including various operations capable of being performed by the mobile terminal. In an embodiment of FIG. 8 (*b*), the sub menu option 830 can include sending a secret message, changing to a vibrate mode, and receiving a call. However, the sub menu option 830 is non-limited by the aforementioned menus and can include various operations capable of being performed by the mobile terminal.

Subsequently, the mobile terminal can sense a second input signal 840 input on the change to vibrate mode operation among the sub menu option 830. In this instance, the mobile terminal determines to perform mapping to the change to vibrate mode operation and can induce a user to perform a gesture to be mapped to the operation. For example, the mobile terminal displays such a message as 'perform gesture' on the display unit and can induce a user to perform a gesture operation when the user is wearing an insole.

In this instance, as shown in FIG. 8 (*c*), an insole can sense a gesture that a position of a left insole and a position of a right insole are switched from each other. In addition, the insole can transmit a signal of the gesture that the position of the left insole and the position of the right insole are switched from each other to the mobile terminal. The mobile terminal can map the signal of the gesture that the position of the left insole and the position of the right insole are switched from each other to an operation of the change to vibrate mode of the mobile terminal based on the signal received from the insole.

Meanwhile, in another embodiment, if an event occurs among the sub menu option 830, the mobile terminal can receive a second input signal input on an operation of responding to the occurred event. For example, the event can include receiving a call, receiving a message and the like. Further, the operation of responding to the event can include responding to a received call, checking a received message, sending a reply and the like. In this instance, the mobile terminal determines to perform mapping to the operation of responding to the occurred event and can receive an input signal including a gesture to be mapped to the operation from an insole.

In relation to this, the insole can sense a gesture of pushing the insole by a big toe. Further, the insole can transmit an input single including the gesture of pushing the insole by the big toe to the mobile terminal. By doing so, the mobile terminal can map the gesture input pushing the insole by the big toe to the operation of responding to the occurred event in the mobile terminal. The embodiments mentioned earlier in FIG. 7 and FIG. 8 are non-limited and various operations of a device can be mapped to various gesture inputs sensed by an insole.

FIG. 9 is a diagram illustrating an embodiment of a method of activating an insole according to an embodiment of the present invention. An insole described in the present invention performs a function in a state of being installed in the inside of a shoe. Unlike a mobile terminal, the insole can perform various functions when a user is unable to see the insole. In addition, since the insole is installed in the inside of a shoe, it may be not easy to charge a battery. In addition, while a user is wearing shoes, it is preferable not to activate the insole unless the user intends to use a specific function. Hence, the insole is preferably activated only when a predetermined function is used. If there is no function to be used, the insole can be deactivated.

In relation to this, in one embodiment, an insole can be activated by a sensing unit and a controller mounted on the insole itself. First of all, the insole can sense a first input signal. In this instance, the first input signal corresponds to a signal for activating the insole. Further, if the sensed first input signal corresponds to a predetermined gesture input, the insole can be activated. For example, as shown in FIG. 9 (*a*), the first input signal may correspond to a gesture input pushing the insole by a big toe. In relation to this, as mentioned earlier in FIG. 2, the insole can include a pressure sensor in a position corresponding to the big toe. In particular, the insole can sense a pressure greater than a pressure applied in a situation of normally wearing shoes via the pressure sensor mounted on the insole.

Further, for example, as shown in FIG. 9 (*b*), the first input signal may correspond to a gesture input pushing the ground on tiptoe. As mentioned earlier in FIG. 2, the insole can include a pressure sensor in a position corresponding to a big toe, a gyro sensor, an acceleration sensor and the like. In particular, the insole can sense a pressure of the insole installed in the inside of a shoe at an end of a big toe, an angle of the insole, and an angular speed of the insole via the pressure sensor, the gyro sensor and the like mounted on the insole. Meanwhile, besides the embodiments shown in FIG. 9 (*a*) and FIG. 9 (*b*), the insole can be activated by various gesture inputs.

In another embodiment, the insole can be activated or deactivated by transmitting a sensed signal to the mobile terminal and receiving an activation signal from the mobile terminal. In particular, the insole senses a first input signal and can transmit the sensed first input signal to the mobile terminal. For example, the first input signal can include a gesture input pushing the insole by a big toe, a gesture input pushing the ground on tiptoe and the like shown in FIG. 9 (*a*) and FIG. 9 (*b*). In this instance, if the received first input signal corresponds to a predetermined gesture input, the mobile terminal can transmit an activation signal to the insole. Hence, the insole can be activated by receiving the activation signal from the mobile terminal.

Meanwhile, if a second input signal is sensed, the insole can be deactivated. In one embodiment, if the second input signal is sensed via a sensing unit and a controller mounted on the insole itself, the insole can be deactivated. In another embodiment, if the second input signal sensed, the insole can be deactivated by transmitting the sensed second input signal to the mobile terminal and receiving a deactivation signal from the mobile terminal. For example, the second input signal may correspond to a gesture input identical to a gesture input shown in FIG. 9 (*a*). In addition, for example, if a gesture input is not sensed during predetermined time, the insole can be deactivated.

Figure 11:
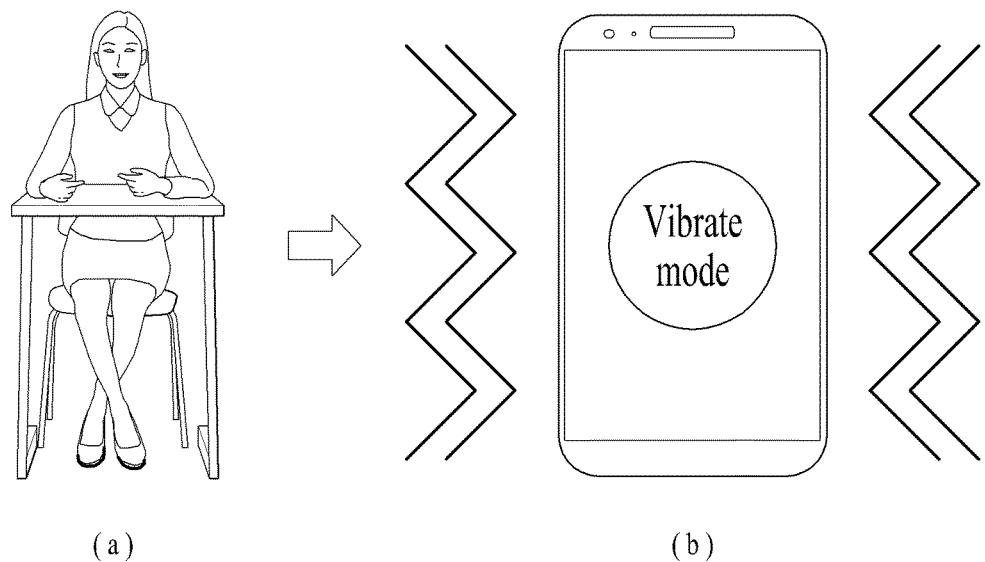
FIG. 11 is a diagram of an embodiment for a mobile terminal to perform a predetermined function based on a gesture input sensed by an insole.
Figure 12:
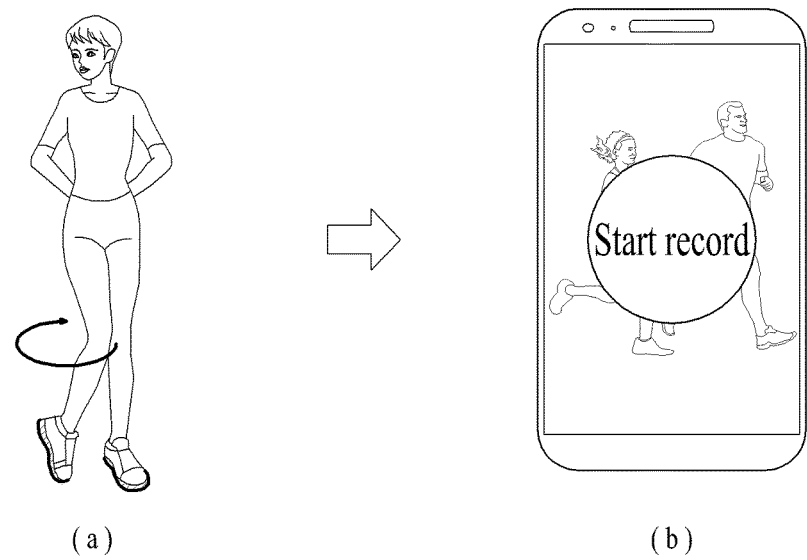
FIG. 12 is a diagram of an embodiment for a mobile terminal to perform a predetermined function based on a gesture input sensed by an insole.

In the following, FIGS. 10 to 17 show embodiments of performing a predetermined function according to a gesture input sensed by an insole. In particular, FIGS. 10 to 12 show embodiments of performing a predetermined function performed by a mobile terminal, and FIGS. 13 to 17 show embodiments of performing a predetermined function based on a signal sensed by an insole and a signal sensed by an external device. In FIGS. 10 to 17, the mobile terminal and the insole are paired with each other, and the mobile terminal and the external device are also paired with each other. In addition, the insole and the external device are also paired with each other. Meanwhile, FIGS. 10 to 17 illustrate the insole in an activated state.

Turning next to FIGS. 10 to 12, which show embodiments of performing a predetermined function by a mobile terminal based on a gesture input sensed by an insole. In the embodiments of FIG. 10 to FIG. 12, the insole senses a first input signal and can transmit the sensed first input signal to the mobile terminal. Further, the mobile terminal can control a predetermined function to be performed according to the received first input signal. In this instance, the predetermined function may correspond to an operation mapped to the mobile terminal in response to the first input signal sensed by the insole. In relation to this, as mentioned earlier in FIG. 7 and FIG. 8, mapping a gesture input sensed by the insole to the predetermined function can be preferentially performed. In the following, various embodiments are explained in FIG. 10 to FIG. 12 in relation to the aforementioned predetermined function. Yet, an embodiment of performing the predetermined function performed by the mobile terminal is non-limited by the embodiments of FIG. 10 to FIG. 12.

First of all, FIG. 10 is a diagram illustrating an example of controlling a predetermined function based on a gesture input sensed by an insole according to an embodiment of the present invention. More specifically, FIG. 10 is a diagram illustrating a method of controlling a music application of a mobile terminal based on a gesture input sensed by an insole.

In one embodiment, referring to FIG. 10 (a), an insole can sense a gesture of moving a tiptoe of a foot up and down two times while a heel of the foot and the ground are in contact. In this instance, the insole, which has performed the gesture, may correspond to at least one of a left insole and a right insole. Thus, the insole can transmit a sensed input signal to a mobile terminal. Subsequently, the mobile terminal can determine whether the received input signal, i.e., the gesture moving the tiptoe of the foot up and down two times while the heel of the foot and the ground are in contact, corresponds to a predetermined mapping gesture. In this instance, the gesture moving the tiptoe of the foot up and down two times while the heel of the foot and the ground are in contact can be mapped to a corresponding operation of playing music in the music application in advance. Hence, the mobile terminal can play music in the music application according to the received input signal. Meanwhile, the mobile terminal can execute the music application and play music according to the received input signal.

In another embodiment, referring to FIG. 10 (b), an insole can sense a gesture of moving a tiptoe of a foot in right direction while a heel of the foot and the ground of a certain position are in contact. In this instance, the insole, which has performed the gesture, may correspond to at least one of a left insole and a right insole. Thus, the insole can transmit a sensed input signal to a mobile terminal. Subsequently, the mobile terminal can determine whether the received input signal, i.e., the gesture moving the tiptoe of the foot in right direction while the heel of the foot and the ground of a certain position are in contact, corresponds to a predetermined mapping gesture. In this instance, the gesture moving the tiptoe of the foot in right direction while the heel of the foot and the ground of a certain position are in contact can be mapped to a corresponding operation of moving music to a next song in the music application in advance. Hence, the mobile terminal can move currently playing music or music to be played to next music in the music application according to the received input signal.

In addition, in another embodiment, referring to FIG. 10 (c), an insole can sense a gesture of moving a tiptoe of a foot in left direction while a heel of the foot and the ground of a certain position are in contact and can transmit a sensed input signal to a mobile terminal. Subsequently, the mobile terminal can determine whether the received input signal, i.e., the gesture moving the tiptoe of the foot in left direction while the heel of the foot and the ground of a certain position are in contact, corresponds to a predetermined mapping gesture. In this instance, the gesture moving the tiptoe of the foot in left direction while the heel of the foot and the ground of a certain position are in contact can be mapped to a corresponding operation of moving music to a previous song in the music application in advance. Hence, the mobile terminal can move currently playing music or music to be played to previous music in the music application according to the received input signal.

The present invention is non-limited by the aforementioned embodiments. Each of gesture inputs sensed by the insole can be mapped to a different operation in the music application of the mobile terminal. In addition, the aforementioned gesture input can be mapped to various applications in the mobile terminal without being limited to the music application.

FIG. 11 is a diagram illustrating an example of controlling a predetermined function based on a gesture input sensed by an insole according to an embodiment of the present invention. More specifically, FIG. 11 is a diagram illustrating a method of switching a use mode of a mobile terminal based on a gesture input sensed by an insole.

A user intends to switch a use mode of a mobile terminal to a vibration mode or a silent mode when the user wants to concentrate on something or wants not to be interrupted in the middle of using the mobile terminal. For example, when the user watches a movie in a movie theater or studies in a library, the user may switch the use mode of the mobile terminal to the vibration mode or the silent mode. Further, the user can switch the use mode of the mobile terminal to the vibration mode or the silent mode in the middle of using the mobile terminal in a state of not catching other's eye. For example, when the user is in a meeting or in a class, the user may switch the use mode of the mobile terminal to the vibration mode or the silent mode. In this instance, the user can switch the use mode of the mobile terminal in a state of wearing shoes in which insoles are installed without adding a separate input signal to the mobile terminal.

Referring to FIG. 11, an insole can sense a gesture that a left insole and a right insole are arranged in opposite way. The gesture may correspond to a gesture of overlapping two feet with each other. In this instance, the insole can transmit a sensed input signal to the mobile terminal Subsequently, the mobile terminal can determine whether the received input signal, i.e., the gesture that the left insole and the right insole are arranged in opposite way, corresponds to a predetermined mapping gesture. In this instance, the gesture that the left insole and the right insole are arranged in opposite way can be mapped to a corresponding operation of switching a mode into the vibration mode or the silent mode in the mobile terminal in advance. Hence, the mobile terminal can switch the use mode of the mobile terminal into the vibration mode or the silent mode according to the received input signal.

FIG. 12 is a diagram illustrating an example of controlling a predetermined function based on a gesture input sensed by an insole according to an embodiment of the present invention. More specifically, FIG. 12 is a diagram illustrating a method of controlling an exercise application of a mobile terminal based on a gesture input sensed by an insole.

A user can perform an exercise while holding a mobile terminal. In this instance, if the user holds the mobile terminal by a hand while performing the exercise, it may be difficult to concentrate on the exercise and it is apprehended that a risk of dropping the mobile terminal may occur in the middle of performing the exercise. Hence, it preferable to keep the mobile terminal in a pocket or the like in the middle of performing the exercise. In this instance, in order to use an exercise application, inconvenience of taking out the mobile terminal from the pocket again may occur. Hence, if an insole is installed, the user can use the exercise application via the insole instead of the mobile terminal by adding a gesture input to the insole.

Referring to FIG. 12, the insole can sense a gesture of rotating a heel of a foot left and right while a tiptoe of the foot and the ground are in contact. For example, a left insole or a right insole is fixed on the ground and the remaining insole can perform a gesture input. This is a posture of performing warm-up prior to performing an exercise and may correspond the posture indicating a start of the exercise. In this instance, the insole can transmit a sensed input signal to the mobile terminal. Subsequently, the mobile terminal can determine whether the received input signal, i.e., the gesture rotating the heel of the foot left and right while the tiptoe of the foot and the ground are in contact, corresponds to a predetermined mapping gesture. In this instance, the gesture rotating the heel of the foot left and right while the tiptoe of the foot and the ground are in contact can be mapped to a corresponding operation of starting an exercise record in the exercise application of the mobile terminal in advance. In this instance, the exercise record can include exercise time, exercise distance, exercise speed and the like. Hence, the mobile terminal can start the exercise record in the exercise application of the mobile terminal according to the received input signal. In addition, the mobile terminal can start the exercise record by executing the exercise application in the mobile terminal according to the received input signal.

Meanwhile, activating the insole and starting the exercise record in the exercise application of the mobile terminal according to the input signal sensed by the insole can be consecutively performed. As mentioned earlier in FIG. 9 (b), if a gesture of contacting a tiptoe of a shoe in which the insole is installed to the ground is sensed, the insole can be activated by a controller mounted on the insole itself. Further, if a gesture of rotating the tiptoe of the shoe left and right is consecutively sensed while the tiptoe of the shoe and the ground are in contact, the mobile terminal can start the exercise record by executing the exercise application of the mobile terminal. By doing so, a user can easily control the exercise application using the insole.

The present invention is non-limited by the aforementioned embodiments of FIG. 11 and FIG. 12. Each of gesture inputs sensed by the insole can be mapped to a different operation of the mobile terminal. In addition, in order to perform the aforementioned predetermined function, various gesture inputs except the aforementioned gesture input can be mapped to operations of the mobile terminal.

Meanwhile, if an event occurs in the mobile terminal, the mobile terminal can respond to the occurred event based on a gesture input sensed by the insole. In one embodiment, an event of receiving a message may occur in the mobile terminal. More specifically, the mobile terminal can provide a notification on the message reception to a user. In this instance, the insole can sense a gesture input pushing the insole by a big toe. Further, the insole can transmit the sensed gesture input to the mobile terminal.

In this instance, the mobile terminal can determine whether the gesture input pushing the insole by the big toe corresponds to a gesture input mapped to a predetermined function. In this instance, the gesture pushing the insole by the big toe can be mapped to an operation of responding to the occurred event in advance in the mobile terminal. Hence, the mobile terminal executes a message application in the mobile terminal according to the received input signal and can display the received message.

In this instance, if it is necessary to check a plurality of messages or a length of a message to be checked is longer than a length of the display unit, the mobile terminal can perform a scroll operation based on a gesture input sensed by the insole. For example, the insole can sense a gesture input of dragging a foot in down direction while the foot and the ground are in contact. In this instance, the gesture of pushing the insole by the big toe and the gesture of dragging the foot in down direction can be sensed at the same time. In this instance, the mobile terminal scrolls down a message based on the received gesture input and can display the message on the mobile terminal.

In another embodiment, an event of receiving a phone call may occur in the mobile terminal. More specifically, the mobile terminal can provide a notification on the phone call reception to a user. In this instance, the insole can sense a gesture input pushing the insole by a big toe, and the insole can transmit the sensed gesture input to the mobile terminal. The mobile terminal can determine whether the gesture input pushing the insole by the big toe corresponds to a gesture input mapped to a predetermined function. As mentioned in the foregoing description, the gesture pushing the insole by the big toe can be mapped to an operation of responding to the event received from the mobile terminal in advance. Hence, the mobile terminal can connect to the phone call received by the mobile terminal according to the input signal received from the insole.

Meanwhile, when the phone call is received by the mobile terminal, the insole can sense a gesture input pushing the insole two times by a big toe. In this instance, the mobile terminal can determine whether the gesture input pushing the insole two times by the big toe corresponds to a gesture input mapped to a predetermined function. In this instance, the gesture pushing the insole two times by the big toe can be mapped to an operation of declining the phone call received by the mobile terminal in advance. Hence, the mobile terminal can decline the phone call received by the mobile terminal according to the input signal received from the insole.

Further, when the phone call is received by the mobile terminal, the insole can sense a gesture input pushing the insole two times by the big toe and moving a foot in one direction among left, right, up and down direction while the foot and the ground are in contact. In this instance, the mobile terminal can determine whether the gesture input pushing the insole two times by the big toe and moving the foot in one direction among left, right, up and down direction while the foot and the ground are in contact corresponds to a gesture input mapped to a predetermined function. In this instance, the aforementioned gesture can be mapped to an operation of declining the phone call received by the mobile terminal and searching for a decline message list in advance. Further, the mobile terminal can search for a message on the decline message list by a drag gesture of the insole. In this instance, the mobile terminal can transmit a decline message corresponding to a point on which the drag gesture of the insole is ended on the decline message list to the mobile terminal, which has transmitted the phone call.

Figure 13:
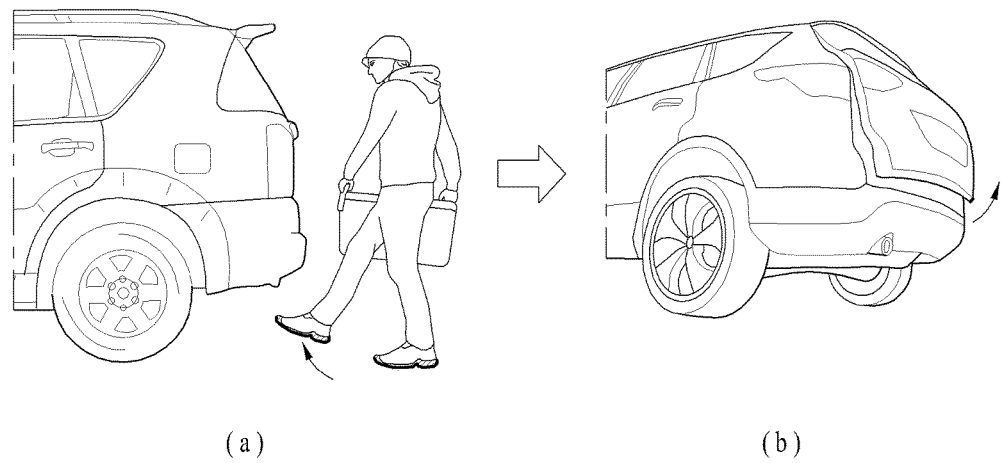
FIG. 13 is a diagram of an embodiment for an external device to perform a predetermined function based on a gesture input sensed by an insole.
Figure 14:
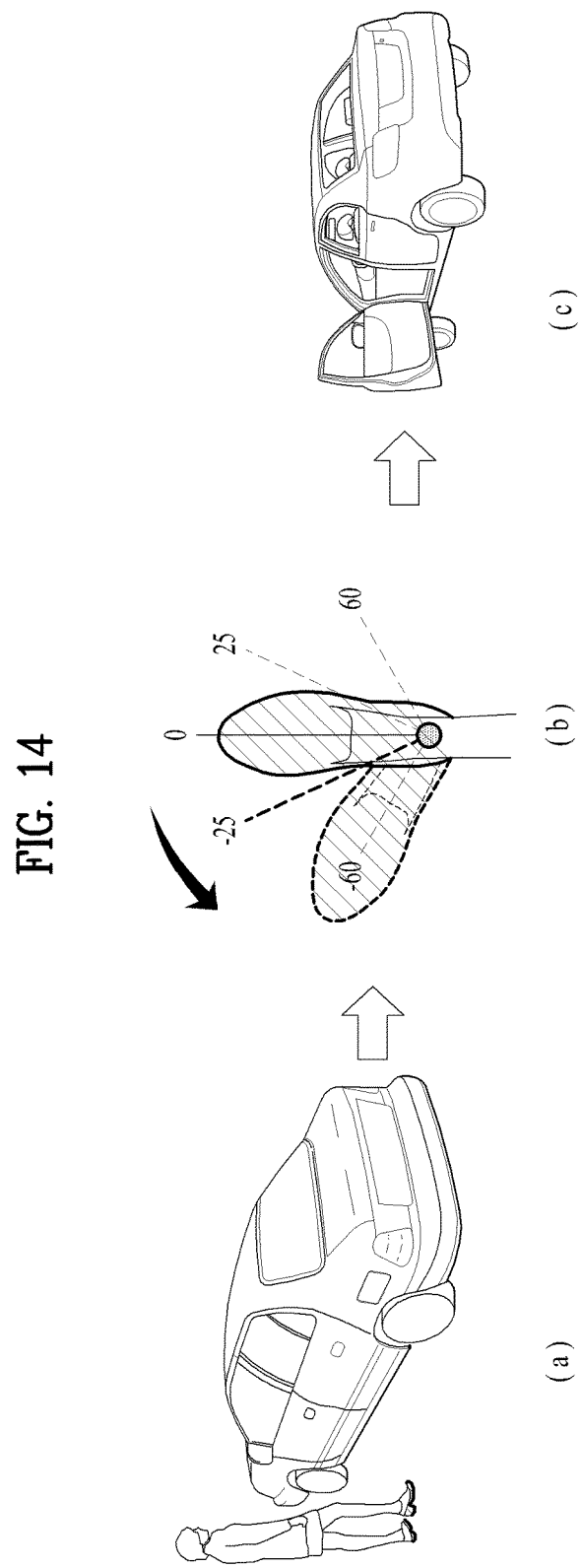
FIG. 14 is a diagram of an embodiment for an external device to perform a predetermined function based on a gesture input sensed by an insole.

Next, FIGS. 13 and 14 show embodiments of performing a predetermined function in an external device based on a gesture input sensed by an insole. More specifically, FIGS. 13 and 14 are diagrams illustrating a method of controlling a car corresponding to one of external devices based on a gesture input sensed by an insole. In FIGS. 13 and 14, assume that the insole, the mobile terminal and the car are paired with each other.

In the embodiments of FIGS. 13 and 14, the insole senses a first input signal and can transmit the sensed first input signal to the mobile terminal. In addition, the mobile terminal can transmit a control signal to the external device to make the external device perform a predetermined function according to the received first input signal. Hence, the external device can perform the predetermined function according to the received control signal. For example, as shown in FIG. 4, the external device can include a car, a headset, a smartwatch, a smart glass and the like.

In relation to this, as mentioned earlier in FIG. 7 and FIG. 8, it can preferentially perform a step of mapping a gesture input sensed by the insole to the predetermined function of the external device. In the following, the embodiments of FIGS. 13 and 14 are just an embodiment of controlling the external device by the gesture input sensed by the insole, by which the present invention is non-limited.

When a user intends to load up luggage into a car, both hands of the user may be full of the luggage. In this instance, in order for the user to open a door or a trunk of the car, the user should put the luggage down on the ground and it may give annoyance to the user. Hence, if the user wears shoes in which insoles are installed, the user can control the car by adding a gesture input to the insoles.

In one embodiment, as shown in FIG. 13 (a), an insole can sense a gesture of lifting up a foot toward the front. For example, when a left insole or a right insole is fixed on the ground, the remaining insole can perform the gesture input. In this instance, the insole can transmit a first input signal, which is the sensed gesture input, to a mobile terminal. In addition, the mobile terminal can determine whether the gesture input included in the first input signal corresponds to a gesture mapped to a predetermined function. In an embodiment of FIG. 13, the gesture of lifting up the foot toward the front can be mapped to an operation of opening a trunk of a car in advance. Hence, the mobile terminal can transmit a control signal for opening the trunk to the car. Further, as shown in FIG. 13 (b), the car can open the trunk of the car based on the received control signal.

In addition, in another embodiment, as shown in FIG. 14 (a), the insole can sense a gesture of moving a tiptoe of a foot in the left while a heel of the foot is fixed. In this instance, the insole can transmit a first input signal corresponding to the sensed gesture input to the mobile terminal. Further, the mobile terminal can determine whether the gesture input included in the first input signal corresponds to a gesture mapped to a predetermined function. In an embodiment of FIG. 14, the gesture of moving the tiptoe of the foot in the left while the heel of the foot is fixed can be mapped to an operation of opening a driver's door of the car in advance. Hence, the mobile terminal can transmit a control signal for opening the driver's door to the car. In addition, as shown in FIG. 14 (b), the car can open the driver's door of the car based on the received control signal. Meanwhile, the mobile terminal receives not only the gesture input sensed by the insole but also a signal indicating location information of the insole from the insole or the car and may be then able to control the car based on the signal.

In one embodiment, referring to FIG. 13, the insole can sense a gesture of lifting up a foot toward the front. In this instance, the insole can transmit a first input signal corresponding to the sensed gesture input to the mobile terminal. Further, the insole or the car can sense location information of the insole for the car. For example, since the insole and the car are paired with each other, the insole or the car can sense the location information of the insole for the car based on a signal sensed by sensors attached to each of the devices or signal strength between the car and the insole. In an embodiment of FIG. 13 (a), the location information of the insole may indicate that the insole is positioned at the back of the car or near the trunk. In this instance, the insole or the car can transmit a second input signal corresponding to the location information of the insole to the mobile terminal, and the first input signal or the second input signal can be transmitted to the mobile terminal irrespective of an order.

Subsequently, the mobile terminal can determine whether the received first input signal and the second input signal correspond to a predetermined mapping gesture. In this instance, a gesture of lifting up a foot toward the front at the front of the trunk can be mapped to a corresponding operation of opening the trunk of the car in advance. Hence, the mobile terminal can transmit a control signal to the car to make the car perform the predetermined function based on the first input signal and the second input signal. In particular, as shown in FIG. 13 (b), the car can control the trunk to be opened based on the received control signal.

In another embodiment, referring to FIG. 14 (a), the insole or the car can sense location information of the insole for the car. For example, since the insole and the car are paired with each other, the insole or the car can sense the location information of the insole for the car based on a signal sensed by sensors attached to each of the devices or signal strength between the car and the insole. In an embodiment of FIG. 14 (a), the location information of the insole may indicate that the insole is positioned at a driver's seat of the car. In this instance, the insole or the car can transmit a first input signal corresponding to the location information of the insole to the mobile terminal.

In addition, as shown in FIG. 14 (b), the insole can sense a gesture of moving a tiptoe of a foot in the left while a heel of the foot is fixed. For example, when a left insole or a right insole is fixed on the ground, the remaining insole can sense the gesture input. In this instance, the insole can transmit a second input signal corresponding to the sensed gesture input to the mobile terminal.

Subsequently, the mobile terminal can determine whether the received first input signal and the second input signal correspond to a predetermined mapping gesture. In this instance, a gesture of moving a tiptoe of a foot to the left at a position near a driver's seat of a car can be mapped to a corresponding operation of opening a door of the driver's seat of the car in advance. Hence, the mobile terminal can transmit a control signal to the car based on the first input signal and the second input signal to make the car perform a predetermined function. As shown in FIG. 14 (c), the car can control the door of the driver's seat to be opened based on the received control signal.

Further, in another embodiment, the insole or the car senses location information of the insole indicating that the insole is located in the vicinity of the car and can transmit a first input signal corresponding to the location information to the mobile terminal. In addition, the insole can sense a gesture of moving a tiptoe of a foot in the right while a heel of the foot is fixed. In this instance, the insole can transmit a second input signal corresponding to the sensed gesture input to the mobile terminal. Subsequently, the mobile terminal can determine whether the received first input signal and the second input signal correspond to a predetermined mapping gesture. In this instance, the gesture of moving the tiptoe of the foot in the right in the vicinity of the car can be mapped to a corresponding operation of opening the rest of doors except the door of the driver's seat. Hence, mobile terminal can transmit a control signal to the car. Further, the car can control the rest of doors except the door of the driver's seat to be opened based on the received control signal.

Meanwhile, the mobile terminal can perform all or a part of a predetermined function according to whether a gesture input sensed by the insole belongs to a predetermined range. In this instance, the predetermined range of the gesture input can be determined based on at least one of pressure, area, acceleration, a slope, a size of an operation of a gesture input sensed by the insole.

In one embodiment, if a gesture input sensed by the insole corresponds to a gesture input belonging to the predetermined range, the mobile terminal can control a predetermined function to be performed. For example, as shown in the embodiment of FIG. 13, if the insole senses a gesture of lifting up a foot toward the front, the mobile terminal can control a trunk of a car to be fully opened. In another embodiment, if a gesture input sensed by the insole corresponds to a gesture input not belonging to the predetermined range, the mobile terminal can control a predetermined function to be partly performed. For example, in the embodiment of FIG. 13, when the insole senses a gesture of lifting up a foot toward the front, if the extent of lifting up the foot belongs to a range smaller than a predetermined angle, the mobile terminal can control the trunk of the car to be partly opened.

In relation to this, the predetermined range can include various ranges and the mobile terminal can control the predetermined function to be gradationally performed based on a range to which a gesture input belongs. Further, a method of controlling the predetermined function according to the predetermined range is non-limited by the aforementioned embodiment and the method can also be applied to a different embodiment of the present invention.

Figure 15:
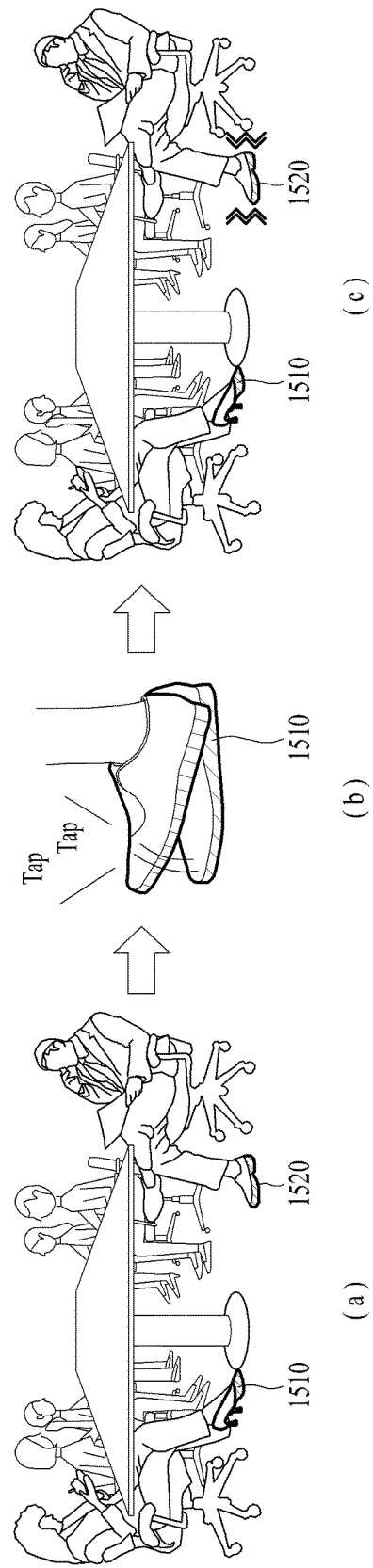
FIG. 15 is a diagram illustrating an example of controlling a predetermined function based on a gesture input sensed by an insole according to an embodiment of the present invention.

FIG. 15 is a diagram illustrating an example of controlling a predetermined function based on a gesture input sensed by an insole according to an embodiment of the present invention. More specifically, FIG. 15 is a diagram illustrating a method of controlling a different insole corresponding to an external device based on a gesture input sensed by an insole. In this instance, the different insole corresponds to not a left insole and a right insole worn on a user but an insole worn on a different user.

When many people are gathering and talking, a user may find it difficult to deliver a message to one person among the people while avoiding a gaze of a different person. In this instance, it may be difficult to deliver a message via a mobile terminal as well as voice. However, if the user wears shoes in which an insole is installed, the user can provide vibration to an insole worn on a different person by adding a gesture input to the insole of the user.

First of all, referring to FIG. 15 (a), a plurality of members are in a meeting. In this instance, an A user seating at the left and a B user seating at the right are wearing insoles 1510/1520 only. Referring to FIG. 15 (b), the insoles 1510 installed in shoes of the A user can senses a gesture of moving a tiptoe of a foot up and down two times while a heel of the foot is fixed on a certain point of the ground. For example, the sensed gesture may correspond to a gesture performed by a remaining insole when a left insole or a right insole is fixed on the ground.

In this instance, in one embodiment, the insole can transmit a first input signal corresponding to the sensed gesture input to a mobile terminal of the A user. The mobile terminal can determine whether the received first input signal corresponds to a predetermined mapping gesture. In this instance, the gesture of moving the tiptoe of the foot up and down two times while the heel of the foot is fixed on a certain point of the ground can be mapped to a corresponding operation of transmitting a message to a different user wearing an insole. Hence, the mobile terminal can control vibration to be generated on the insole 1520 of the B user based on the received first input signal. In particular, as shown in FIG. 15 (c), vibration may occur on the insole 1520 of the B user. For example, the mobile terminal can transmit a control signal to a mobile terminal of the B user based on the first input signal. Further, the mobile terminal of the B user can control vibration to be generated on the insole 1520 of the B user based on the received control signal. In addition, the B user can check a secret message received from the A user.

In addition, in another embodiment, the insole 1510 can transmit the first input signal corresponding to the sensed first gesture input to the insole 1520 of the B user. In this instance, the insole 1520 can generate vibration via a haptic module of the insole 1520 by a controller mounted on the insole 1520 itself. Moreover, it can transceive a message between insoles in various ways.

Next, FIGS. 16 and 17 are diagrams illustrating an example of controlling a predetermined function based on a gesture input sensed by an insole according to an embodiment of the present invention. More specifically, FIGS. 16 and 17 are diagrams illustrating a method of controlling a mobile terminal in consideration of not only a gesture input sensed by an insole but also an input signal sensed by an external device.

Recently, as a case of proving exercise management via a mobile terminal is increasing, an exercise management function is provided not only by a smartphone but also by a smartwatch. However, when providing the exercise management function based on an input signal sensed by a single terminal, it may provide an incorrect exercise management function to a user. Hence, according to an embodiment of the present invention, the controller 180 can provide an exercise management function suitable for a user to the user in consideration of not only an input signal sensed by an insole but also a signal sensed by an external device.

First of all, FIG. 16 shows a method of inducing a user to exercise with good posture based on an input signal sensed by a neckband 1610 and an input signal sensed by an insole 1620 when the user practices a squat exercise. First of all, the insole 1620 can sense pressure when a left insole and a right insole are contacted with the ground. As mentioned earlier in FIG. 2, since 8 pressure sensors are mounted on the insole 1620, pressure can be sensed according to a position of the insole 1620 via the 8 pressure sensors. In this instance, the insole can transmit a first input signal corresponding to the pressure sensed by the insole 1620 to the mobile terminal.

Further, the neckband 1610 can sense a slope. More specifically, since a gyro sensor is mounted on the neckband 1610, the neckband can sense a slope of an upper body of a user. In this instance, the neckband can transmit a second input signal corresponding to the slope sensed by the neckband 1610 to the mobile terminal. In this instance, the first input signal and the second input signal can be transmitted to the mobile terminal irrespective of an order of the input signals.

Subsequently, the mobile terminal can determine whether the received first input signal and the second input signal correspond to a predetermined mapping gesture. In this instance, the good posture of a squat operation may correspond to a posture of bending an upper body of a user toward the front about 15 degrees when weight of the user is applied to heels of feet. Hence, the mobile terminal can provide the user with an exercise guide to make the user perform a predetermined function based on the first input signal and the second input signal. For example, as shown in FIG. 16 (*b*), the mobile terminal displays such a message as 'move forward your chest' on an exercise application and may be then able to induce the user to have good posture when the user practices the squat operation.

In addition, the mobile terminal can transmit a control signal to the neckband 1610 to make the neckband perform a predetermined function based on the received first input signal and the second input signal. For example, the neckband 1610 provides the user with such a message as 'move forward your chest' as an audio signal and may be then able to induce the user to have good posture while the user performs the squat operation. Further, the mobile terminal can transmit a control signal to the insole 1620 to make the insole perform a predetermined function based on the received first input signal and the second input signal. For example, the insole 1620 generates vibration at a position corresponding to a heel of a foot using a haptic module and may be then able to induce the user to have good posture while the performs the squat operation.

FIG. 17 shows a method of recording an exercise based on an input signal sensed by a smartwatch 1710 and an input signal sensed by insoles 1720 when a user practices a running exercise. First of all, as shown in FIG. 17 (*a*), the insoles 1720 can sense a gesture that a tiptoe of a left insole and a tiptoe of a right insole are contacted with the ground and heels of the insoles are apart from the ground. In addition, the insoles 1720 can transmit a first input signal corresponding to the gesture sensed by the insoles and a slope to the mobile terminal.

Further, the smartwatch 1710 can sense acceleration. More specifically, since an acceleration sensor is mounted on the smartwatch 1710, the smartwatch can sense current acceleration of a user. In this instance, the smartwatch can transmit a second input signal corresponding to the acceleration sensed by the smartwatch 1710 to the mobile terminal. In this instance, the first input signal and the second input signal can be transmitted to the mobile terminal irrespective of an order of the input signals.

Subsequently, the mobile terminal can determine whether the first input signal and the second input signal correspond to a predetermined mapping gesture. In this instance, if a slope of the insole exceeds a predetermined angle when heels of both feet are not contacted with the ground, it may be mapped to a state of running in advance. Further, whether a current state corresponds to a state of running or a state of starting to run can be mapped based on an acceleration change. Hence, the mobile terminal can control a predetermined function to be performed based on the received first input signal and the second input signal.

For example, if acceleration sensed by the smartwatch 1710 becomes faster all of a sudden, as shown in FIG. 17 (*b*), the mobile terminal can start to record a running exercise of a user in an exercise application. In addition, for example, if acceleration sensed by the smartwatch 1710 is almost constantly maintained, the mobile terminal can display a current running record of the user on the exercise application. Meanwhile, the embodiment of FIG. 17 is non-limited by the aforementioned embodiments and can include various operations related to exercise.

The aforementioned embodiments of FIG. 16 and FIG. 17 can be applied to various operations of the exercise application, by which the present invention is non-limited. In addition, in FIG. 16 and FIG. 17, the sensed input signal can be applied to a different application as well as the exercise application.

Figure 18:
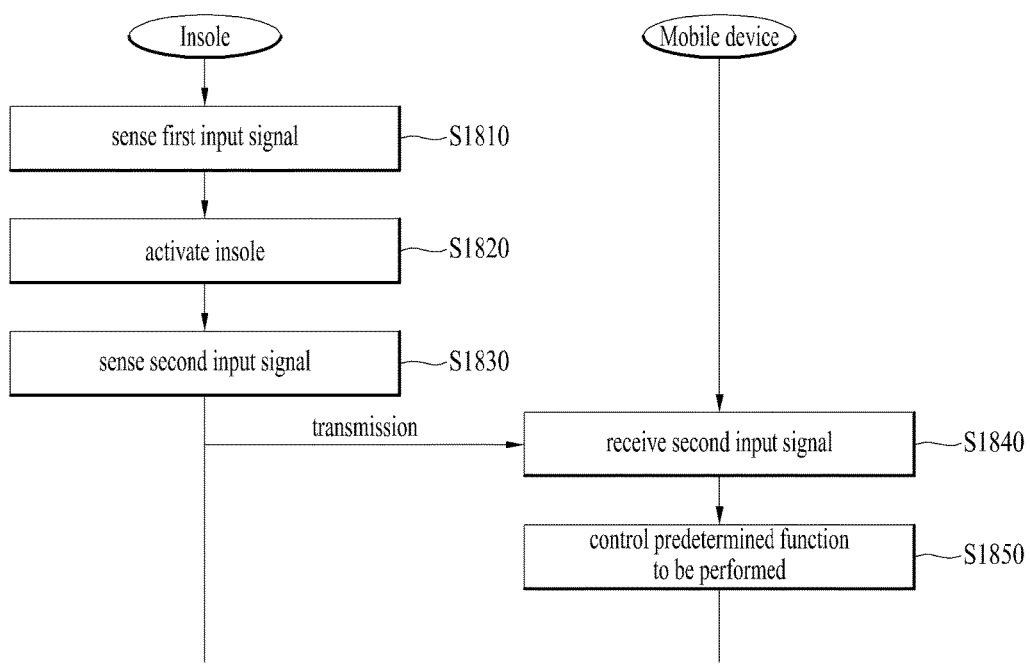
FIG. 18 is a flowchart for a method of controlling an insole and a mobile terminal according to one embodiment of the present invention.

FIG. 18 is a flowchart for a method of controlling an insole and a mobile terminal according to one embodiment of the present invention. Each of steps of FIG. 18 described in the following can be controlled by a controller of an insole shown in FIG. 1 and a controller of an insole shown in FIG. 3. First of all, an insole can sense a first input signal (S1810). As mentioned earlier in FIG. 9, the first input signal corresponds to a gesture input and can include a gesture pushing the insole by a big toe, a gesture pushing the ground on tiptoe and the like.

Subsequently, the insole can activate the insole based on the first input signal (S1820). More specifically, the insole can be activated by a controller mounted on the insole itself. Meanwhile, as mentioned earlier in FIG. 9, the insole can transmit the first input signal to a mobile terminal. Further, the mobile terminal can transmit an activation signal to the insole based on the first input signal. Further, the insole can be activated based on the activation signal.

Subsequently, the insole can sense a second input signal (S1830). In addition, the insole can transmit the sensed second input signal to the mobile terminal. For example, the second input signal may correspond to a gesture input, pressure, a slope and the like sensed by the insole. The mobile terminal can then receive the second input signal (S1840, and the mobile terminal can control a predetermined function to be performed based on the received second input signal (S1850). In this instance, as mentioned earlier in FIG. 11 and FIG. 12, the mobile terminal can determine whether a gesture input included in the second input signal is mapped to the predetermined function in advance, and if the gesture input is mapped to the predetermined function, the mobile terminal can control the predetermined function to be performed in the mobile terminal.

Figure 19:
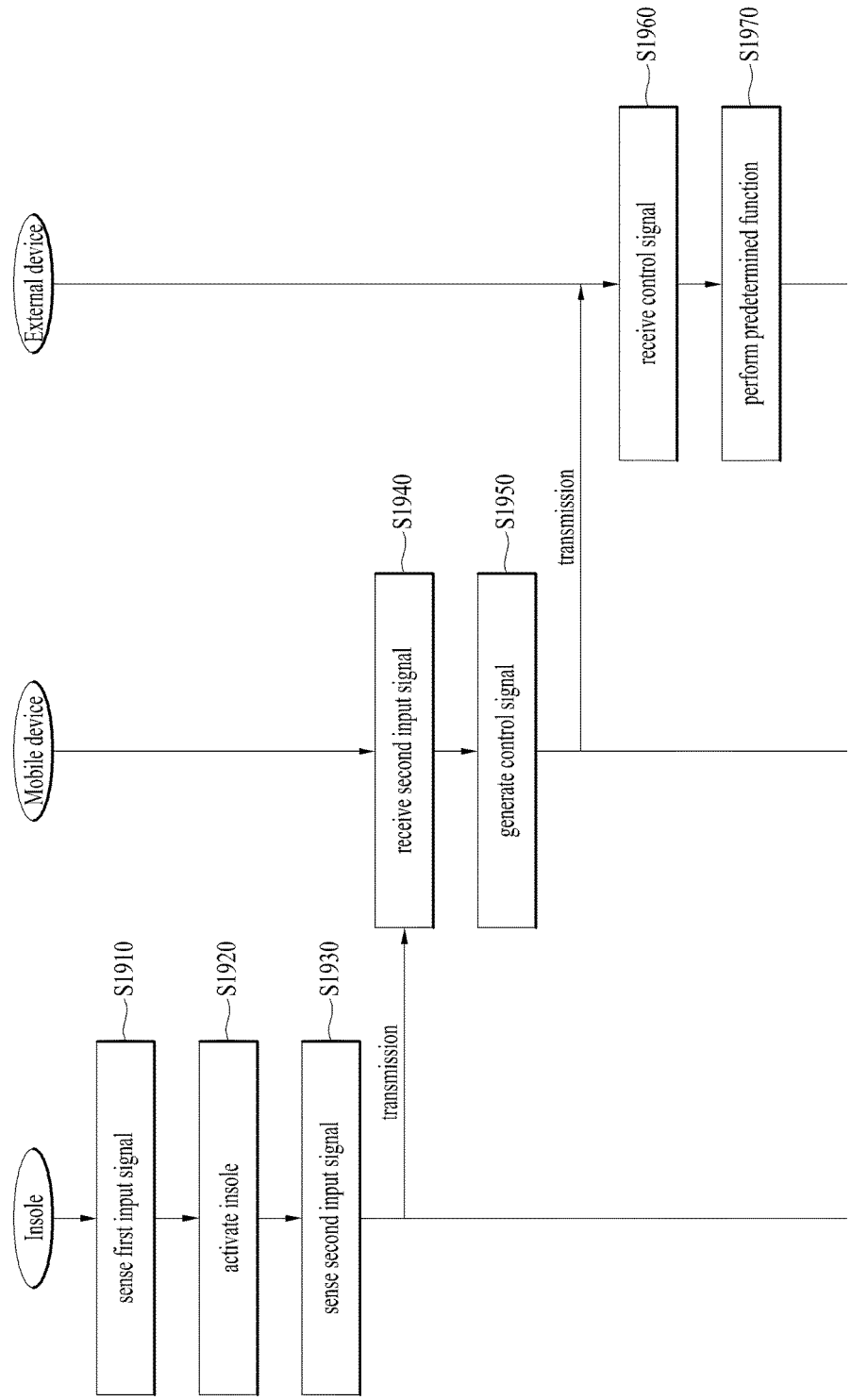
FIG. 19 is a flowchart for a method of controlling an insole and a mobile terminal according to one embodiment of the present invention.

Next, FIG. 19 is a flowchart illustrating a method of controlling an insole and a mobile terminal according to one embodiment of the present invention. Each of steps of FIG. 19 described in the following can be controlled by a controller of an insole shown in FIG. 1 and a controller of an insole shown in FIG. 3. In addition, in each embodiment of FIG. 19, detail explanation on a part identical or corresponding to the aforementioned embodiment of FIG. 18 is omitted.

As shown, an insole can sense a first input signal (S1910), activate the insole (S1920), and sense a second input signal (S1930). In this instance, the insole can transmit the sensed second input signal to the mobile terminal. Subsequently, the mobile terminal can receive the second input signal (S1940), and generate a control signal to make an external device perform a predetermined function based on the second input signal (S1950). In relation to this, the mobile terminal can determine whether a gesture input corresponding to the received second input signal corresponds to a gesture input mapped to the predetermined function. Further, if the gesture input corresponds to a gesture mapped to the predetermined function, the mobile terminal can transmit the control signal to the external device to make the external device perform the predetermined function.

Subsequently, the external device can receive the control signal from the mobile terminal (S1960). For example, as mentioned earlier in FIG. 14, the external device can include a car, a neckband, a watch-type mobile terminal, a glass-type mobile terminal, an insole of a different user, and the like. In this instance, the external device can perform the predetermined function based on the control signal received from the mobile terminal (S1970). For example, as mentioned earlier in FIG. 13 and FIG. 14, the external device can open a trunk or a door of a car based on the gesture input sensed by the insole. In addition, for example, as mentioned earlier in FIG. 15, the external device can transmit a vibration message to an insole of a different user based on the gesture input sensed by the insole.

Figure 20:
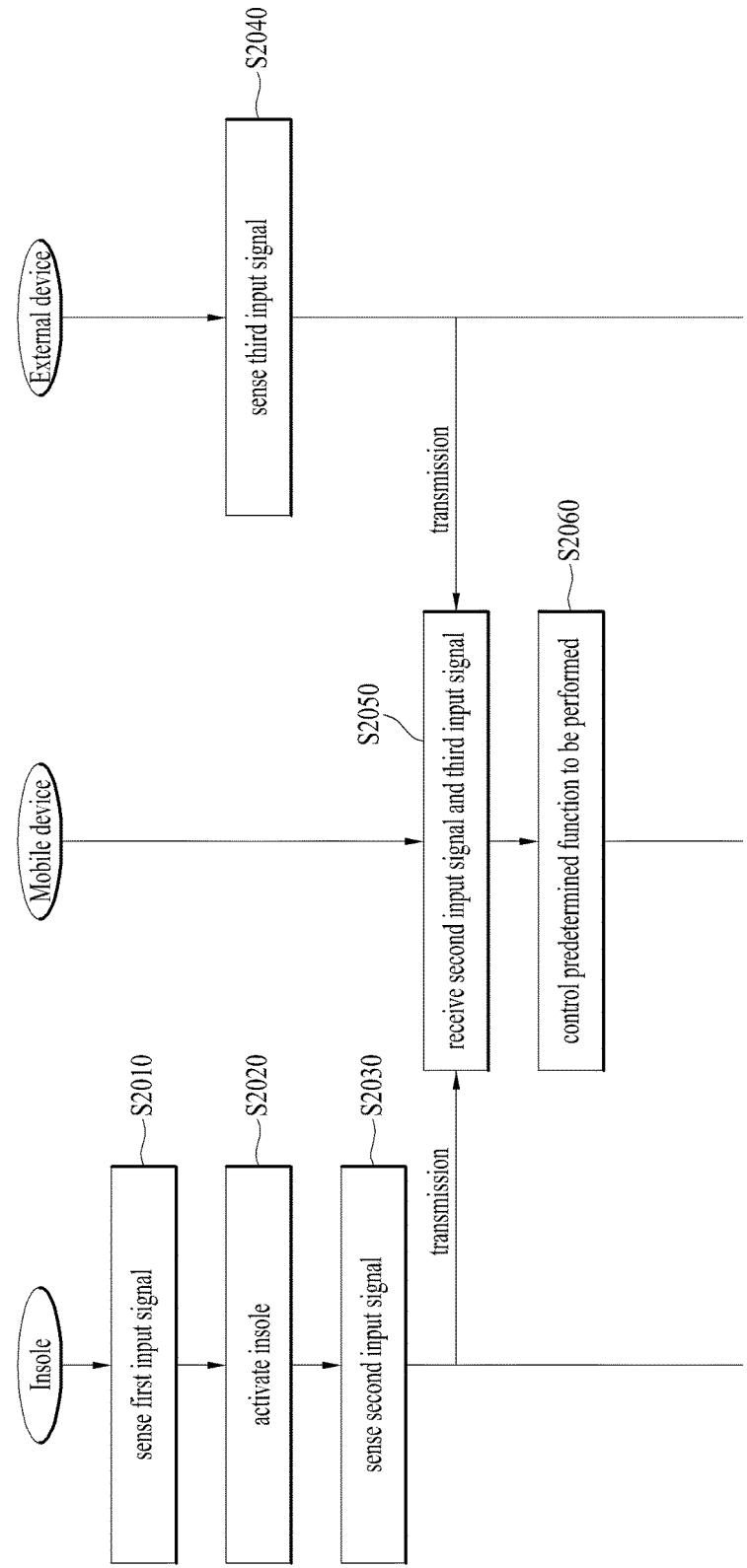
FIG. 20 is a flowchart for a method of controlling an insole and a mobile terminal according to one embodiment of the present invention.

Next, FIG. 20 is a flowchart illustrating a method of controlling an insole and a mobile terminal according to one embodiment of the present invention. Each of steps of FIG. 20 described in the following can be controlled by a controller of an insole shown in FIG. 1 and a controller of an insole shown in FIG. 3. Further, in each embodiment of FIG. 20, a detail explanation on a part identical or corresponding to the aforementioned embodiment of FIG. 18 is omitted at this time.

First of all, an insole can sense a first input signal (S2010), activate the insole based on the sensed first input signal (S2020), and sense a second input signal (S2030). Further, the insole can transmit the sensed second input signal to the mobile terminal.

Meanwhile, an external device can sense a third input signal (S2040). For example, as mentioned earlier in FIG. 13 and FIG. 14, the third input signal may correspond to a signal including location information of the insole for the external device. Further, for example, as mentioned earlier in FIG. 16 and FIG. 17, the third input signal may correspond to a signal including information on acceleration of the external device, a slope of the external device and the like. In addition, the external device can transmit the third input signal to the mobile terminal. In this instance, the steps S2010 to S2030 performed by the insole and the step S2040 performed by the external device can be performed irrespective of an order of the steps.

Subsequently, the mobile terminal can receive the second input signal and the third input signal (S2050), and control a predetermined function to be performed based on the received second input signal and the third input signal (S2060). For example, as mentioned earlier in FIG. 16, the mobile terminal can induce a user to have good exercise posture based on a pressure signal sensed by the insole and a slope signal sensed by the neckband. Further, for example, as mentioned earlier in FIG. 17, the mobile terminal can control an exercise application based on a slope signal and a gesture signal sensed by the insole and an acceleration signal sensed by the mobile terminal.

Accordingly, embodiments of the present invention provide several advantages. For example, the embodiments provide an insole, a mobile terminal and a method of controlling therefor capable of controlling the mobile terminal by adding a gesture input to the insole by a foot. Also, the embodiments provide an insole, a mobile terminal and a method of controlling therefor capable of easily controlling an external device via a gesture input by a foot, when both hands of a user are not free. Further, the embodiments provide an insole, a mobile terminal and a method of controlling therefor capable of providing an exercise guide to a user based on a signal sensed by the insole or a signal sensed by such an external device as a neckband and a smartwatch.

Various embodiments of the present invention may be implemented using a computer-readable code in a medium in which a program is recorded. The computer-readable medium includes recording devices of all types in which computer-readable data are stored. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the computer-readable medium may be realized in the form of a carrier wave (for example, a transmission over the Internet). Further, the computer may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
    a display unit;
    a wireless communication unit configured to wirelessly communicate with an insole in a shoe and an external device; and
    a controller configured to:
    receive a foot gesture input signal from the insole for controlling the mobile terminal or the external device,
    control the function on the mobile terminal according to the foot gesture input signal in response to the foot gesture input signal being mapped as a function of the mobile terminal, and
    transmit a control signal to the external device to control the function on the external device in response the foot gesture input signal being mapped to the function of the external device,
    wherein the control signal to the external device to control the function on the external device is generated by the mobile terminal.

2. The mobile terminal of claim 1, wherein the foot gesture input signal corresponds to a foot placed in the shoe interacting with the insole.

3. The mobile terminal of claim 2, wherein the foot gesture input signal further includes at least one of the foot pressing the insole and the foot moving the insole and shoe in prescribed motions.

4. The mobile terminal of claim 3, wherein the prescribed motions of the foot moving the insole and the shoe include at least one of a heel of the foot remaining fixed while the toe of the insole and shoe moving left and right in predetermined angles, the toe of the insole and shoe remaining fixed and the heel moving up and down in predetermined angles, the heel remaining fixed and the toe moving up and down in predetermined angles, a tapping of the toe of the insole and shoe, and a tapping of the heel of the insole and shoe.

5. The mobile terminal of claim 4, wherein the insole includes a left insole for a left foot and a right insole for a right foot, and wherein the foot gesture input signal further includes heels of the left and right insoles being adjacent each other, the left and right insoles being overlapped with one another, the toes of the right and left insoles being in contact with the ground and the heels being raised from the ground, a kicking motion of one of the right and left insoles, and a rotation of one of the right and left insole.

6. The mobile terminal of claim 1, wherein the controller is further configured to display a user interface including options for mapping the function to one of the mobile terminal and the external device.

7. The mobile terminal of claim 6, wherein the user interface includes:
a first option for selecting the mobile terminal and a second option for selecting the function to be mapped to the mobile terminal based on the foot gesture input signal, and
a third option for selecting the external device and a fourth option for selecting the function to be mapped to the external device based on the foot gesture input signal.

8. The mobile terminal of claim 7, wherein the external device includes a vehicle and the fourth option includes one of unlocking a particular door of the vehicle, unlocking all doors of the vehicle and opening a trunk or hatch of the vehicle in response to the foot gesture input signal.

9. The mobile terminal of claim 7, wherein the second option includes one of sending a secret message, changing the mobile terminal to a vibrate mode, recording a video and receiving an incoming call.

10. The mobile terminal of claim 1, wherein the controller is further configured to transmit a control signal to the external device to perform the function mapped to the external device in response to receiving the foot gesture input signal.

11. The mobile terminal of claim 1, wherein the function of the mobile terminal includes a music function.

12. The mobile terminal of claim 11, wherein the controller is further configured to:
play music in response to a first foot gesture input signal,
play a next music item in a track in response to a second foot gesture input signal, and
play a previous music item in the track in response to a third foot gesture input signal.

13. The mobile terminal of claim 1, wherein the function of the mobile terminal corresponds to recording of a video on the mobile terminal.

14. The mobile terminal of claim 1, wherein the function of the mobile terminal corresponds to an exercise application on the mobile terminal.

15. An insole for a shoe, the insole comprising:
a sensing unit configured to sense foot gesture input signals of a foot placed within the shoe;
a communication unit configured to wirelessly communicate with a mobile terminal; and
a controller configured to:
activate the insole in response to a predetermined first foot gesture input signal,
transmit a signal to the mobile terminal for controlling a function on the mobile terminal in response to a predetermined second foot gesture input signal, wherein the function on the mobile terminal is mapped to the predetermined second foot gesture input signal such the function on the mobile terminal is performed in response to the predetermined second foot gesture input signal, and
transmit a signal to the mobile terminal for controlling a function on an external device communicating with the mobile terminal in response to a predetermined third foot gesture input signal,
wherein the function on the external device is mapped to the predetermined second foot gesture input signal such the function on external device is performed in response to the predetermined third foot gesture input signal.

16. The insole of claim 15, wherein the insole comprises at least one of a left insole and a right insole placed within a left shoe and a right shoe respectively.

17. The insole of claim 16, wherein the predetermined first foot gesture input signal corresponds to a pressing a toe portion of at least one of the first and second insoles, and
wherein the predetermined second foot gesture input signal corresponds to a predetermined foot gesture of at least one of the first and second insoles.

18. The insole of claim 15, further comprising:
a haptic module,
wherein the controller is further configured to provide vibration generated by the haptic module to a user wearing the insole according to a control signal received from the mobile terminal and corresponding to another insole of another user.

19. The insole of claim 15, wherein the controller is further configured to deactivate the insole in response to a predetermined third foot gesture input signal.

20. The insole of claim 15, wherein the controller is further configured to perform pairing with the mobile terminal.

* * * * *